(12) United States Patent
Kneckt et al.

(10) Patent No.: US 12,309,578 B2
(45) Date of Patent: May 20, 2025

(54) PRIVACY ENHANCED BSS AND DISCOVERY MECHANISMS

(71) Applicant: Apple Inc., Cupertino, CA (US)

(72) Inventors: Jarkko L Kneckt, Los Gatos, CA (US); Charles F Dominguez, Redwood City, CA (US); Daniel R Borges, Fremont, CA (US); Debashis Dash, San Jose, CA (US); Elliot S Briggs, Santa Cruz, CA (US); Sidharth R Thakur, San Jose, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 17/949,910

(22) Filed: Sep. 21, 2022

(65) Prior Publication Data

US 2023/0147562 A1 May 11, 2023

Related U.S. Application Data

(60) Provisional application No. 63/277,016, filed on Nov. 8, 2021.

(51) Int. Cl.
*H04W 12/037* (2021.01)
*H04W 12/06* (2021.01)

(52) U.S. Cl.
CPC ......... *H04W 12/037* (2021.01); *H04W 12/06* (2013.01)

(58) Field of Classification Search
CPC .............. H04W 12/03–037; H04W 12/06–069
See application file for complete search history.

(56) References Cited

U.S. PATENT DOCUMENTS

2006/0227972 A1 10/2006 Brok
2007/0159997 A1\* 7/2007 Tsai ...................... H04W 12/50
370/395.2

(Continued)

FOREIGN PATENT DOCUMENTS

EP 1806897 7/2007
EP 4002899 5/2022

(Continued)

OTHER PUBLICATIONS

Search Report for EP Patent Application No. 22203070.2; Mar. 24, 2023.

(Continued)

*Primary Examiner* — Madhuri R Herzog
(74) *Attorney, Agent, or Firm* — Kowert, Hood, Munyon, Rankin & Goetzel, P.C.

(57) ABSTRACT

Systems, methods, and mechanisms for a privacy enhanced basic service set (BSS), including privacy enhancements for both access points and wireless stations as well as privacy enchantments for authentication, association, and discovery operations. Further, the systems, methods, and mechanisms disclosed may continue to support legacy wireless stations and are thus, backward compatible. A station may communicate with a legacy BSS of a wireless network to transition to a PE BSS of the wireless network. The station may receive, from the PE BSS of the wireless network, an encrypted beacon, wherein the encrypted beacon is decoded based on information received from the legacy BSS and perform, with the PE BSS of the wireless network, an encrypted handshake procedure to authenticate and associate with the PE BSS of the wireless network.

20 Claims, 33 Drawing Sheets

(56) References Cited

U.S. PATENT DOCUMENTS

| | | | | |
|---|---|---|---|---|
| 2014/0071881 A1* | 3/2014 | Abraham | ............. | H04W 60/00 |
| | | | | 370/315 |
| 2015/0350974 A1* | 12/2015 | Patil | ................ | H04W 36/0085 |
| | | | | 370/331 |
| 2016/0198327 A1* | 7/2016 | Park | ..................... | H04W 8/005 |
| | | | | 370/330 |
| 2019/0200278 A1 | 6/2019 | Ouzieli | | |
| 2021/0051728 A1* | 2/2021 | Viger | ............... | H04W 74/0833 |
| 2021/0274574 A1* | 9/2021 | Ghosh | .................. | H04W 76/11 |
| 2021/0345418 A1* | 11/2021 | Asterjadhi | ........ | H04W 74/0833 |
| 2023/0087211 A1* | 3/2023 | Hawkes | ............... | H04W 12/73 |
| | | | | 726/2 |

FOREIGN PATENT DOCUMENTS

| | | | | | |
|---|---|---|---|---|---|
| KR | 20040049533 A | * | 6/2004 | | |
| WO | 2016072902 | | 5/2016 | | |
| WO | WO-2022157239 A1 | * | 7/2022 | ............ | H04W 76/15 |

OTHER PUBLICATIONS

Kneckt et al. "AP MLD Beaconing and Discovery"; IEEE 802.11-20/865r2 XP068170308; IEEE-SA Mentor, Piscataway, NJ USA Jul. 29, 2020.

* cited by examiner

TBTT Info Field

| Neighbor AP TBTT Offset | BSSID (optional) | Short BSSID (optional) | BSS Parameters | 20 MHz PSD | MLD Parameters |
|---|---|---|---|---|---|

FIG. 10A

BSS Parameters

| OCT Re-commended | Same SSID | Multiple BSSID | Transmitted BSSID | Member of ESS with 2.4/5 GHz Co-located AP | Unsolicited probe response active | Co-located AP | Reserved |
|---|---|---|---|---|---|---|---|

FIG. 10B

MLD Parameters

| MLD ID [8 bits] | Link ID [4 bits] | Change Sequence [8 bits] | PE AP [1 bit] | Reserved [3 bits] |
|---|---|---|---|---|

FIG. 10C

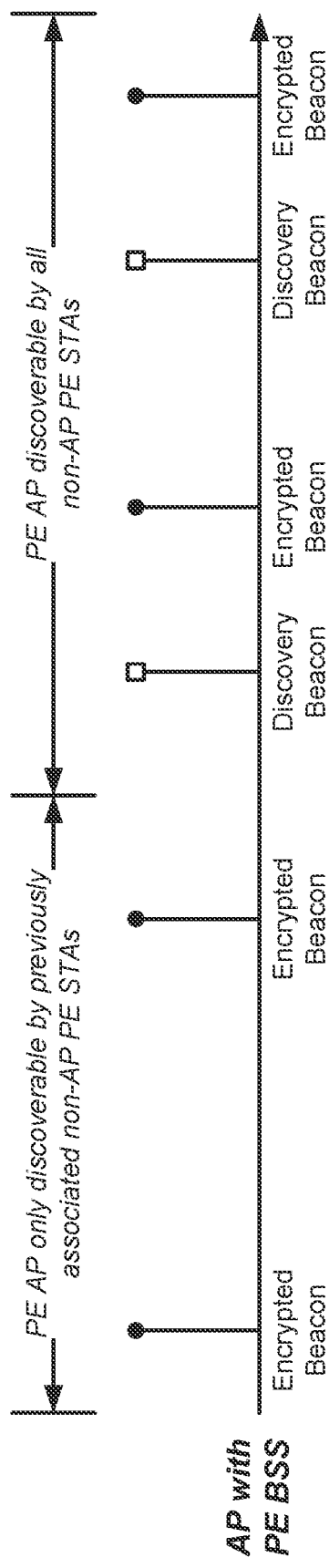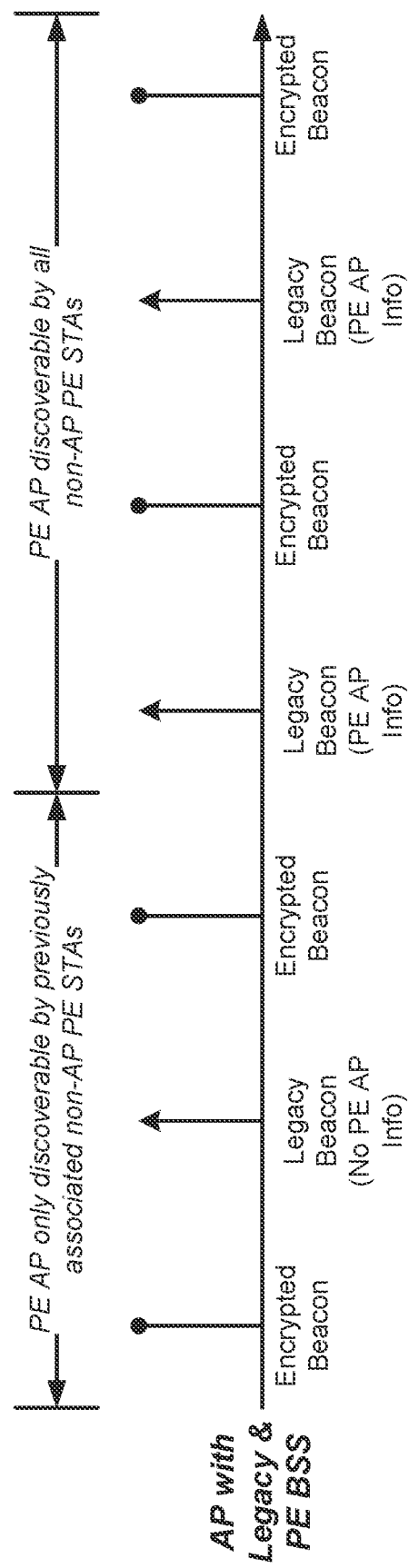
FIG. 11A
FIG. 11B

PRIVACY ENHANCED BSS AND DISCOVERY MECHANISMS

PRIORITY DATA

This application claims benefit of priority to U.S. Provisional Application Ser. No. 63/277,016, titled "Privacy Enhanced BSS and Discovery Mechanisms", filed Nov. 8, 2021, which is hereby incorporated by reference in its entirety as though fully and completely set forth herein.

FIELD

The present application relates to wireless communications, including techniques for a privacy enhanced BSS, including privacy enhancements for both access points and wireless stations as well as privacy enhancements for authentication, association, and discovery operations.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

SUMMARY

Embodiments described herein relate to systems and methods associated with a privacy enhanced BSS, including privacy enhancements for both access points and wireless stations as well as privacy enhancements for authentication, association, and discovery operations.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

For example, in some embodiments, the wireless station may be configured to communicate with a legacy basic service set (BSS) of a wireless network to transition to a privacy enhanced (PE) BSS of the wireless network. The wireless station may be configured to receive, from a PE BSS of the wireless network, an encrypted beacon. The encrypted beacon may be decoded based on information received from the legacy BSS. Further, the wireless station may be configured to perform, with the PE BSS of the wireless network, an encrypted handshake procedure to authenticate and associate with the PE BSS of the wireless network.

As another example, in some embodiments, a wireless station may be and/or may be configured as an Internet of Things (IoT) station. The IoT station may be configured to configure to operate in a PE BSS mode. The IoT station may be configured to communicate with a configuring wireless station of a wireless network to receive information associated with the PE IoT BSS. The information associated with the PE IoT BSS may include at least a channel on which the PE IoT BSS operates. Further, the IoT station may be configured to receive, from the PE IoT BSS, an encrypted beacon. The encrypted beacon may be encrypted by a beacon key specific to the PE IoT BSS. Additionally, the IoT station may perform, with the PE IoT BSS, an encrypted handshake procedure to authenticate and associate with the PE IoT BSS.

As a further example, in some embodiments, a wireless station may be configured to scan (or look) for a BSSID in a PE BSS beacon, e.g., to receive a PE BSS beacon. The wireless station may be configured to attempt to match the BSSID with an address key stored at the wireless station and if (and/or when) the BSSID matches an address key, the wireless station may be configured to decrypt the BSS specific beacon using a BSS specific key stored at the wireless station.

As another example, a wireless station, which may be a non-associated PE wireless station, may be configured to receive, from a PE access point, one or more discovery beacons advertising PE BSSs hosted by the PE access point. The wireless station may be configured to transmit, to the PE access point, a request to setup pre-association security protection. Further, upon setup of pre-association security protection, the wireless station may be configured to transmit, to the PE access point, a protected request frame and receive, from the PE access point, a protected response that includes PE access point parameters. The PE access point parameters may include PE BSS information.

Some embodiments relate to an access point that includes one or more antennas, one or more radios, and one or more processors coupled (directly or indirectly) to the radios. At least one radio is configured to perform Wi-Fi communications, e.g., via a Wi-Fi interface. The access point may perform voice and/or data communications, as well as any or all of the methods described herein.

For example, in some embodiments, an access point, hosting a PE BSS, may be configured to transmit, to a PE wireless station, an encrypted beacon. The encrypted beacon may be decoded based on information received from a legacy BSS. In addition, the access point may be configured to perform, with the PE wireless station, an encrypted handshake procedure to authenticate and associate the PE wireless station with the PE BSS.

As another example, in some embodiments, an access point, may be configured to transmit, to an IoT station, an encrypted beacon. The encrypted beacon may be decoded based on information received from a configuring wireless station associated with the IoT station. The access point may be configured to perform, with the IoT station, an encrypted handshake procedure to authenticate and associate the IoT station with the PE IoT BSS.

As a further example, an access point, which may be a PE access point, may be configured to transmit, to non-associated PE wireless stations, one or more discovery beacons advertising PE BSSs hosted by the PE access point. The access point may be configured to receive, from at least one non-associated PE wireless station, a request to setup a pre-association security protection. Further, upon setup of pre-association security protection, the access point may be configured to receive, from the at least one non-associated PE wireless station, a protected request frame and transmit, to the at least one non-associated PE wireless station, a protected response that includes PE access point parameters. The PE access point parameters may include PE BSS information.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 10A illustrates an example of a TBTT information field/element, according to some embodiments.

FIG. 10B illustrates an example of a BSS parameters field/element, according to some embodiments.

FIG. 10C illustrates an example of an MLD parameters field/element, according to some embodiments.

FIGS. 11A and 11B illustrate examples of encrypted beacon and discovery beacon transmissions, according to some embodiments.

Figure 1:
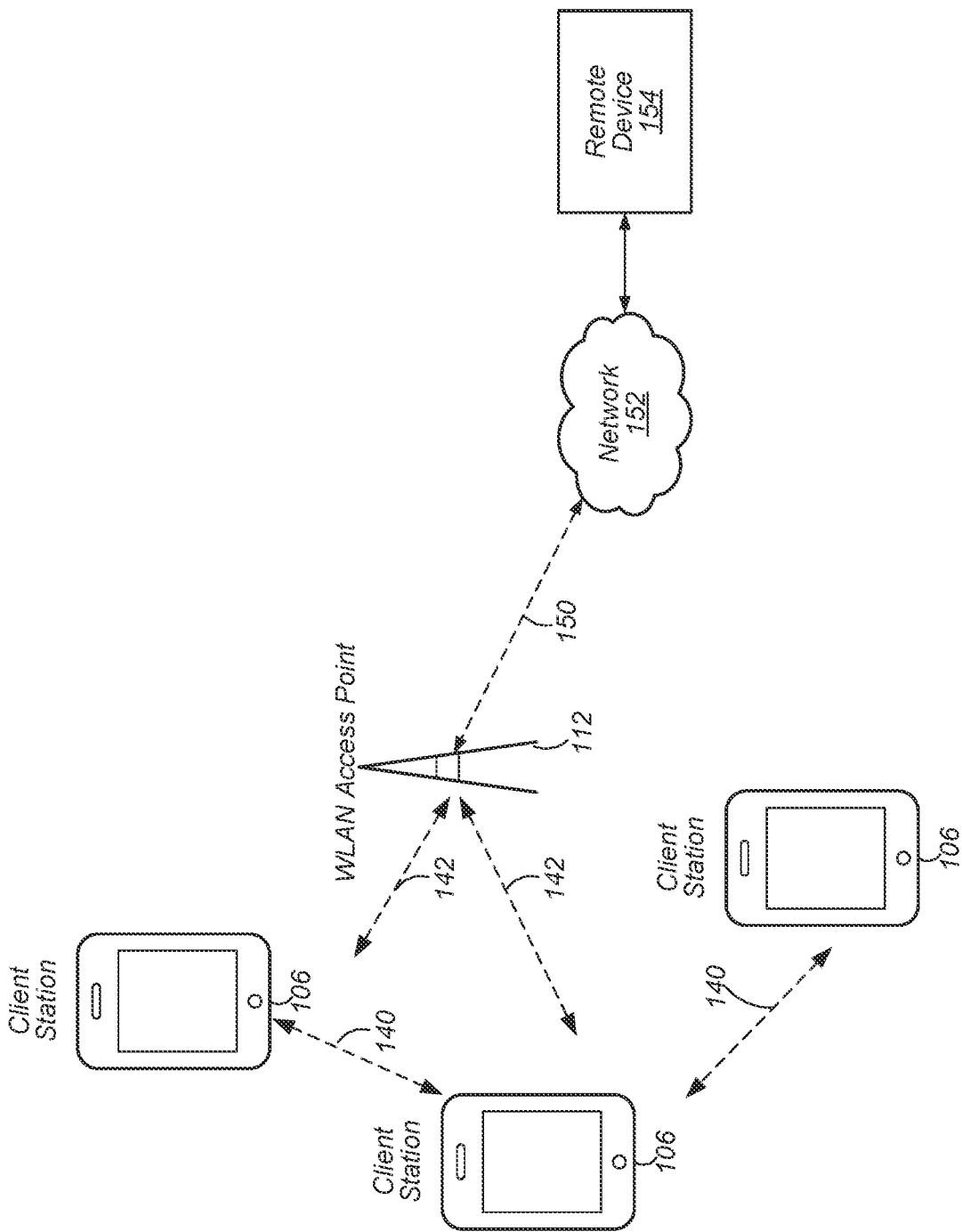
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
PE: Privacy Enhanced
BSS: Basic Service Set Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods associated with a privacy enhanced BSS, including privacy enhancements for both access points and wireless stations as well as privacy enhancements for authentication, association, and discovery operations.

Figure 2:
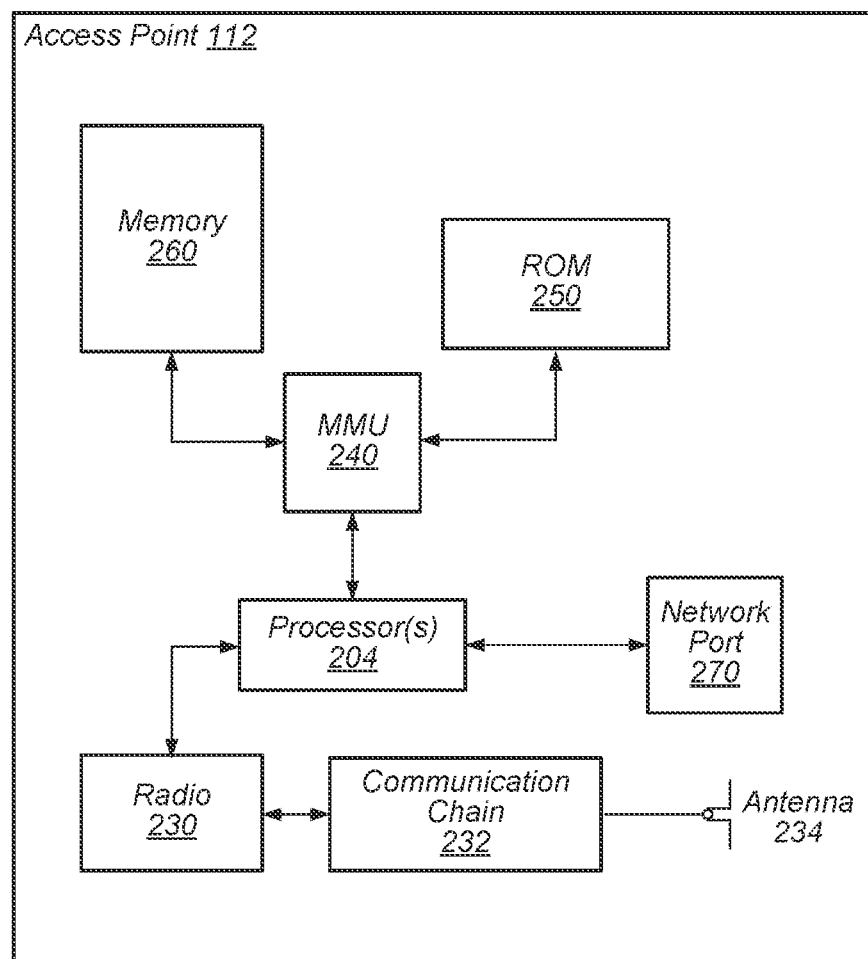
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for a privacy enhanced BSS, including privacy enhancements for both access points and wireless stations as well as privacy enhancements for authentication, association, and discovery operations.

Figure 3A:
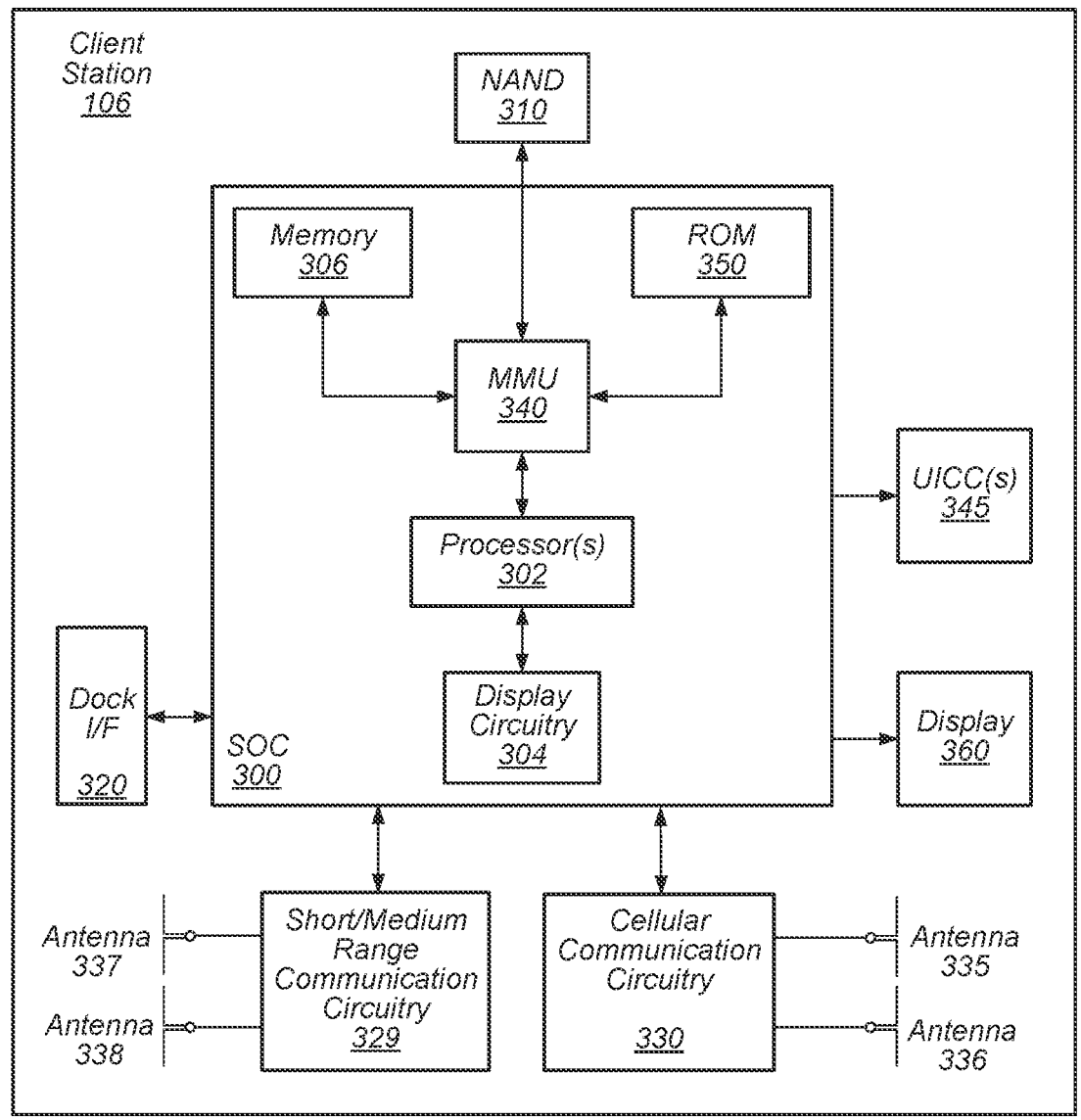
FIG. 3A illustrates an example simplified block diagram of a mobile station (UE), according to some embodiments.

FIG. 3A—Client Station Block Diagram

FIG. 3A illustrates an example simplified block diagram of a client station 106. It is noted that the block diagram of the client station of FIG. 3A is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods associated with a privacy enhanced BSS, including privacy enhancements for both access points and wireless stations as well as privacy enhancements for authentication, association, and discovery operations.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 3B:
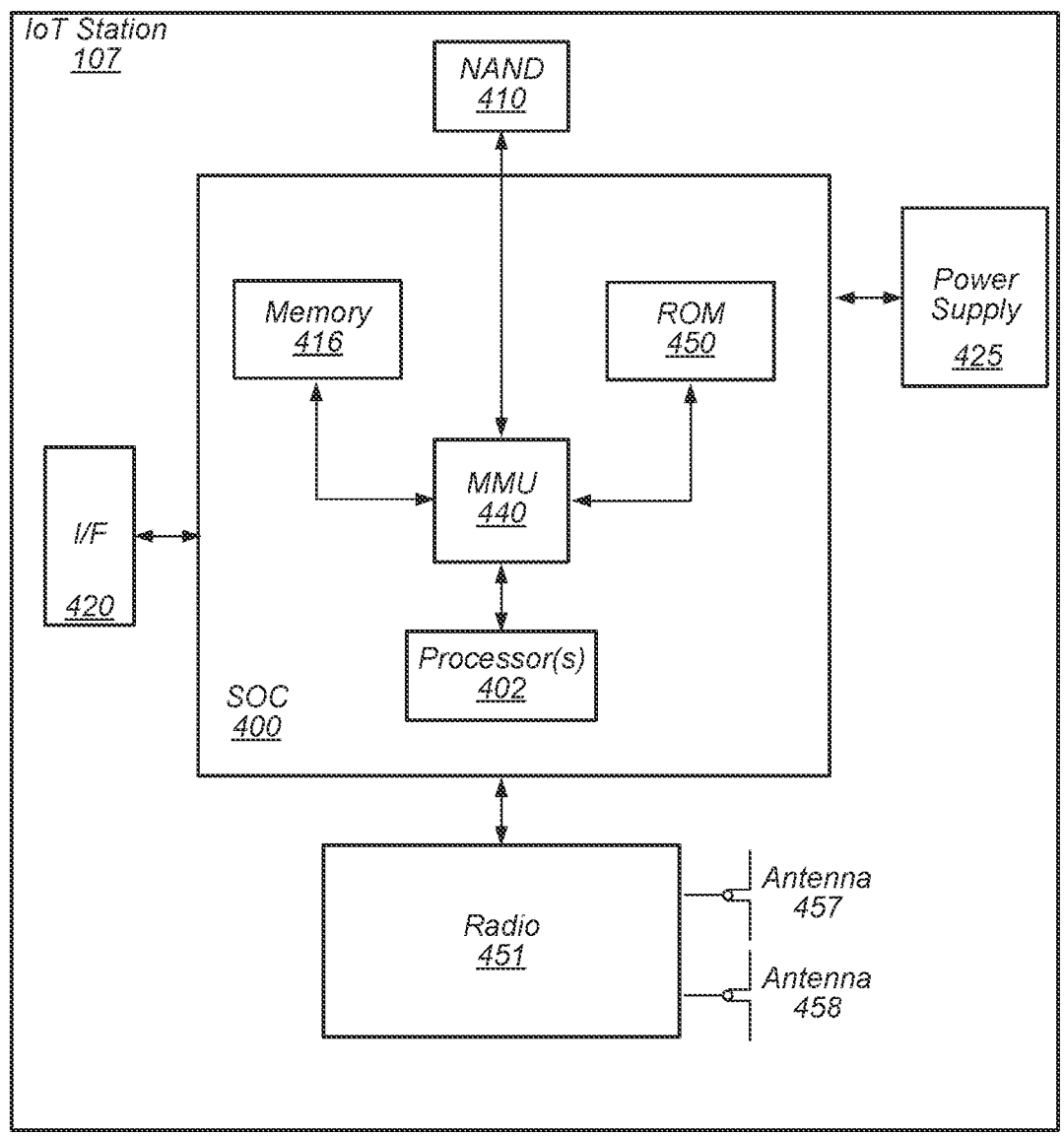
FIG. 3B illustrates an example simplified block diagram of an Internet of Things (IoT) station, according to some embodiments.

FIG. 3B: IoT Station

FIG. 3B illustrates an example simplified block diagram of an IoT station 107, according to some embodiments. According to embodiments, IoT station 107 may include a system on chip (SOC) 400, which may include one or more portions for performing one or more purposes (or functions or operations). The SOC 400 may be coupled to one or more other circuits of the IoT station 107. For example, the IoT station 107 may include various types of memory (e.g., including NAND flash 410), a connector interface (I/F) 420 (e.g., for coupling to a computer system, dock, charging station, light (e.g., for visual output), speaker (e.g., for audible output), etc.), a power supply 425 (which may be non-removable, removable and replaceable, and/or rechargeable), and communication circuitry (radio) 451 (e.g., BT/BLE and/or WLAN).

The IoT station 107 may include at least one antenna, and in some embodiments, multiple antennas 457 and 458, for performing wireless communication with a companion device (e.g., client station 106, AP 112, and so forth) as well as other wireless devices (e.g., client station 106, AP 112, other IoT stations 107, and so forth). In some embodiments, one or more antennas may be dedicated for use with a single radio and/or radio protocol. In some other embodiments, one or more antennas may be shared across two or more radios and/or radio protocols. The wireless communication circuitry 451 may include WLAN logic and/or BT/BLE logic. In some embodiments, the wireless communication circuitry 451 may include multiple receive chains and/or multiple transmit chains for receiving and/or transmitting multiple spatial streams, such as in a multiple-input multiple output (MIMO) configuration.

As shown, the SOC 400 may include processor(s) 402, which may execute program instructions for the IoT station 107. The processor(s) 402 may also be coupled (directly or indirectly) to memory management unit (MMU) 440, which may be configured to receive addresses from the processor (s) 402 and translate those addresses into locations in memory (e.g., memory 416, read only memory (ROM) 450, NAND flash memory 410) and/or to other circuits or devices, such as the wireless communication circuitry 451. The MMU 440 may be configured to perform memory protection and page table translation or set up. In some embodiments, the MMU 440 may be included as a portion of the processor(s) 402.

As noted above, the IoT station 107 may be configured to communicate wirelessly with one or more neighboring wireless devices. In some embodiments, as further described below, IoT station 107 may be configured to perform (and/or assist in the performance of) methods associated with a privacy enhanced BSS, including privacy enhancements for both access points and wireless stations as well as privacy enhancements for authentication, association, and discovery operations.

Privacy Enhanced BSS

In current implementations, current infrastructure networks have many privacy challenges and compromises. For example, legacy stations require access points to be openly discoverable and keep the legacy station's MAC addresses and other identifying information. Further, legacy stations are not privacy optimized and may leak personally identifiable information (PII) (e.g., such as usernames, passwords, Emails, sent messages, data entered into online forms, online profiles, Internet history, physical location when online, online purchase history, search history, social media posts, devices used, work done online, online videos watched, online music, playlists, and so forth) or payment card information (e.g., cardholder data). Additionally, legacy stations may also leak personally correlated information (PCI) that may identify what a legacy station's and/or end user's actions (e.g., applications being run, websites being visited, purchased being made) and/or where the legacy station is operating (e.g., location). Further, legacy BSS features include non-encrypted beacons (thus, all wireless stations can receive beacons and full set of access point parameters), passive and active scanning of privacy enhanced BSSs (thus, all wireless stations in proximity can discover the access point and identify the access point through its Service Set Identifier (SSID) and its Basic Service Set Identifier (BSSID)), association and re-association to PE BSS (thus, all devices can receive access point and wireless station information and allows wireless station tracking), constant access point and wireless station MAC addresses (thus, access point and station tracking is possible via tracking of MAC addresses), and non-encrypted frames (thus, allowing access point and station tracking). Additionally, although privacy enhancements are necessary, since the market has so many legacy WLAN devices, the market will continue to require legacy access points to support legacy wireless stations.

Thus, it appears that WLAN has two alternatives to improve wireless station privacy—legacy access points may be enhanced to include privacy enhanced wireless stations or a new privacy enhanced BSS needs to be introduced. Enhancement of legacy access points may improve wireless station privacy, however, legacy access point privacy would not be improved. Additionally, legacy access points may not be suitable for newer use cases that require access point privacy, such as mobile access points and/or in-vehicle access points.

Embodiments described herein provide systems, methods, and mechanisms for a privacy enhanced BSS, including privacy enhancements for both access points and wireless stations as well as privacy enhancements for authentication, association, and discovery operations. Further, embodiments described herein may provide systems, methods, and mechanisms to continue to support legacy wireless stations. In other words, the embodiments described herein may be (considered) backward compatible.

Figure 4:
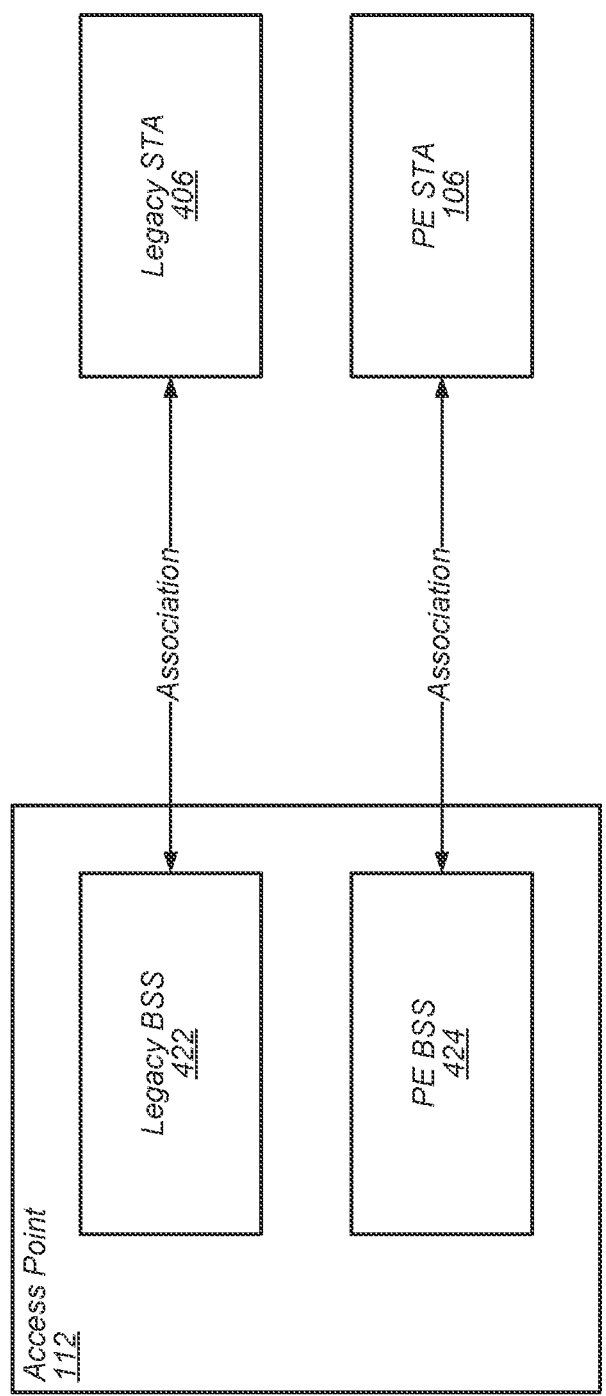
FIG. 4 illustrates an example of an architecture for a privacy enhanced BSS, according to some embodiments.

For example, FIG. 4 illustrates an example of an architecture for a privacy enhanced BSS, according to some embodiments. As shown, an access point, such as access point 112, may support both a legacy BSS 422 and a privacy enhanced (PE) BSS 424. The access point may present as two access points—a first access point broadcasting an SSID and supporting legacy wireless stations (STAs), such as legacy STA 406, and a second access point that does not include its SSID in beacons and supports PE wireless stations, such as PE STA 106. Note that both access points (or BSSs) co-located within access point 112 may operate on the same channel.

Such an architecture as described in FIG. 4, as well as the systems, methods, and mechanisms described herein, provide and/or support privacy improvements such as encrypted beacons, passive and active scanning of PE BSS, association and re-association to a PE BSS, random and changing MAC addresses for both PE access points and PE wireless stations, encrypted frame exchanges, and privacy improved formats for physical layer protocol data units (PPDUs), MAC layer protocol data units (MPDUs), and management MPDUs (MMPDUs), as well as for various other frame formats. Encrypted beacons may allow PE access point elements and buffered traffic indications (TIMs) to be available only for associated PE wireless stations. Passive and active scanning of a PE BSS may allow for improved privacy of the PE BSS as only previously associated PE wireless stations may discover the PE BSS. Additionally, association and re-association to the PE BSS may provide mechanisms to allow both the PE access point's information and the PE wireless station's information to be encrypted. Further, random and changing MAC addresses for both PE access points and PE wireless stations may hinder tracking of both the PE access point and PE wireless station. In addition, encrypted frame exchanges and privacy improved formats for PPDUs, MPDUs, and MMPDUs may offer improved privacy by eliminating element fingerprinting.

Figure 5:
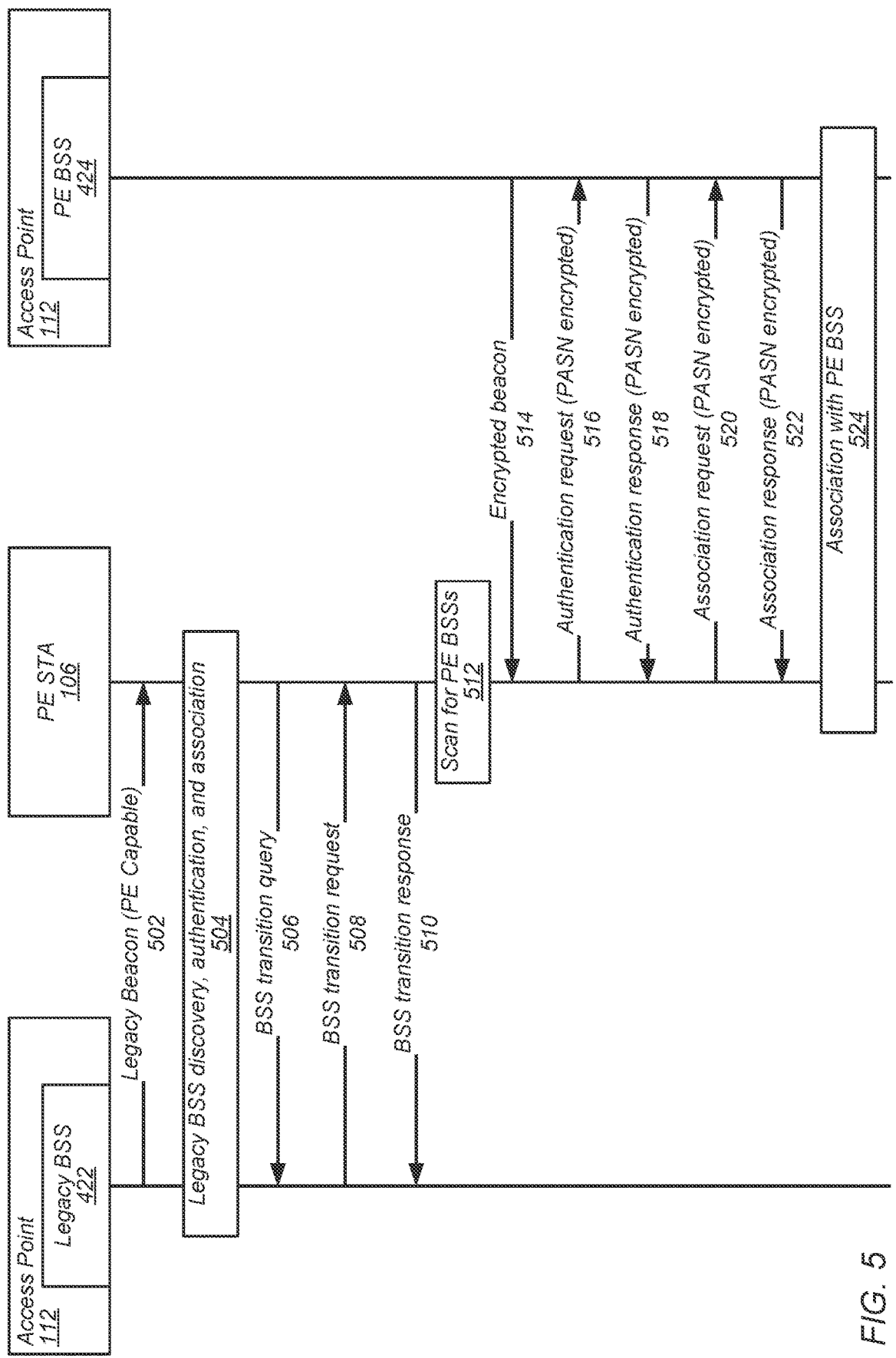
FIG. 5 illustrates an example of signaling for a PE wireless station to associate with a PE BSS of a public network, according to some embodiments.

FIG. 5 illustrates an example of signaling for a PE wireless station to associate with a PE BSS of a public network, according to some embodiments. The signaling shown in FIG. 5 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

APE wireless station, such as PE STA 106, may receive a legacy beacon 502 from a legacy BSS 422 indicating that an access point, such as access point 112, hosting the legacy BSS 422 is PE capable, e.g., indicating that the access point 112 is also hosting a PE BSS 424. In response, at 504, the PE STA 106 may discover, authenticate, and associate with the legacy BSS. In some instances, the legacy BSS 422 may move the PE STA 106 to the PE BSS hosted by the access point. In some instances, the PE STA 106 may optionally transmit a robust BSS transition query 506 to the legacy BSS 422 requesting PE access point recommendations. The PE STA 106 may receive, from the legacy BSS 422, a robust BSS transition request 508 that may include an access point candidate list that may include a neighbor report and beacon reception parameters. The PE STA 106 may send a robust BSS transition response 510 to the legacy BSS 422 indicating the PE STA 106 will transition to a PE BSS, such as PE BSS 424. At 512, the PE STA 106 may scan for a selected PE BSS and then transition to the selected PE BSS, e.g., via use of a pre-association security protocol such as a pre-association security negotiation (PASN) encrypted 4-way handshake (e.g., fast BSS transition signaling over-the-air), a public key to protect identifiers, e.g., such as an Identifier Protection Key (IPK), and/or performing a faux (or dummy) association to establish security (e.g., encryption) prior to performing an actual association that is protected (e.g., encrypted). Thus, the PE STA 106 may receive an encrypted beacon 514 from the PE BSS and may respond with a PASN encrypted authentication request 516. Then, the PE STA 106 may receive a PASN encrypted authentication response 518 and may respond with a PASN encrypted association request 520. The PE STA 106 may receive a PASN encrypted association response 522 from the PE BSS. At 524, the PE STA 106 may be associated with the encrypted PE BSS.

Figure 6:
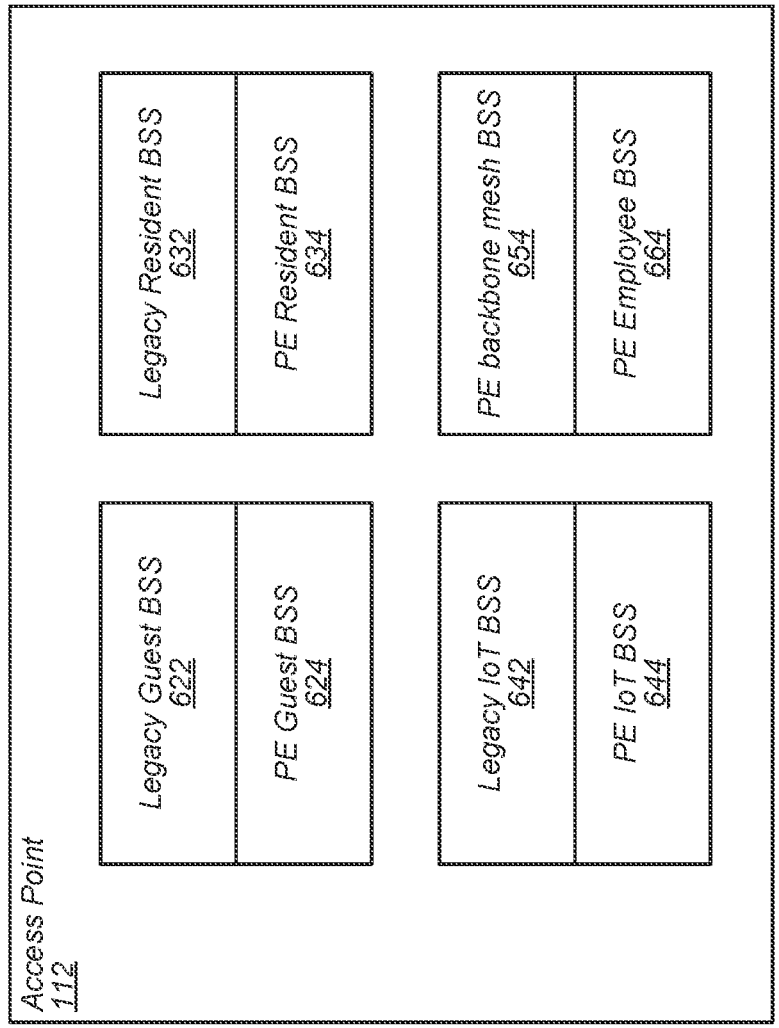
FIG. 6 illustrates an example of an access point supporting multiple networks/BSSs, according to some embodiments.

Note that the signaling illustrated in FIG. 5 may also be adopted and/or implemented on residential networks, e.g., via an access point with multiple networks, e.g., as illustrated by FIG. 6. As shown, a residential access point, such as access point 112, may host multiple networks/BSSs (e.g., such as legacy guest BSS 622 and PE guest BSS 624, legacy resident BSS 632 and PE resident BSS 634, legacy Internet of Things (IoT) BSS 642 and PE IoT BSS 644 in which the PE IoT BSS 644 may be a hidden network, PE backbone mesh BSS 654, as well as a PE employee BSS 664), each BSS having different security domains and/or keys. Additionally, each network may have a legacy BSS and a PE BSS. Note, however, that a network may only have PE BSSs if the network serves only PE wireless stations, such as PE wireless station 106. Further, a legacy BSS may offer easy network discovery to associate legacy wireless stations while also allowing initial authentication and association of PE wireless stations. Further, as described above in reference to FIG. 5, the legacy BSS (either legacy guest BSS 622 or legacy resident BSS 632) may steer PE wireless stations to operate with the PE BSS (e.g., either PE guest BSS 624 or PE resident BSS 634). In addition, a PE wireless station may directly associate with the PE BSS (e.g., either PE guest BSS 624 or PE resident BSS 634), e.g., if the PE wireless station knows the PE BSS's keys.

As noted, some networks within the residential network may attempt to remain invisible and/or undiscoverable. For example, a mesh backbone network (e.g., PE backbone mesh BSS 654) may only be used between access points (e.g., in a residential mesh network), thus, backbone mesh access points may be configured to find certain beacon types. As another example, an employee service (and/or government service and/or public safety service) network (e.g., PE employee BSS 664) may be a private network that is only discoverable to/by employee devices that have an application and/or configuration to operate in the employee service network. As a further example, an IoT network (e.g., legacy IoT BSS 642 and/or PE IoT BSS 644) may remain hidden. Note that an IoT device may be configured to operate in a single network. Thus, the configuration may be done to the legacy IoT BSS 642 if the IoT device and/or a configuring device (e.g., wireless station) does not support PE BSS. Alternatively, the configuration may be done to the PE IoT BSS 644 if the IoT device supports PE BSS. However, an IoT network may not have steering from the legacy IoT BSS 642 to the PE IoT BSS 644.

Figure 7A:
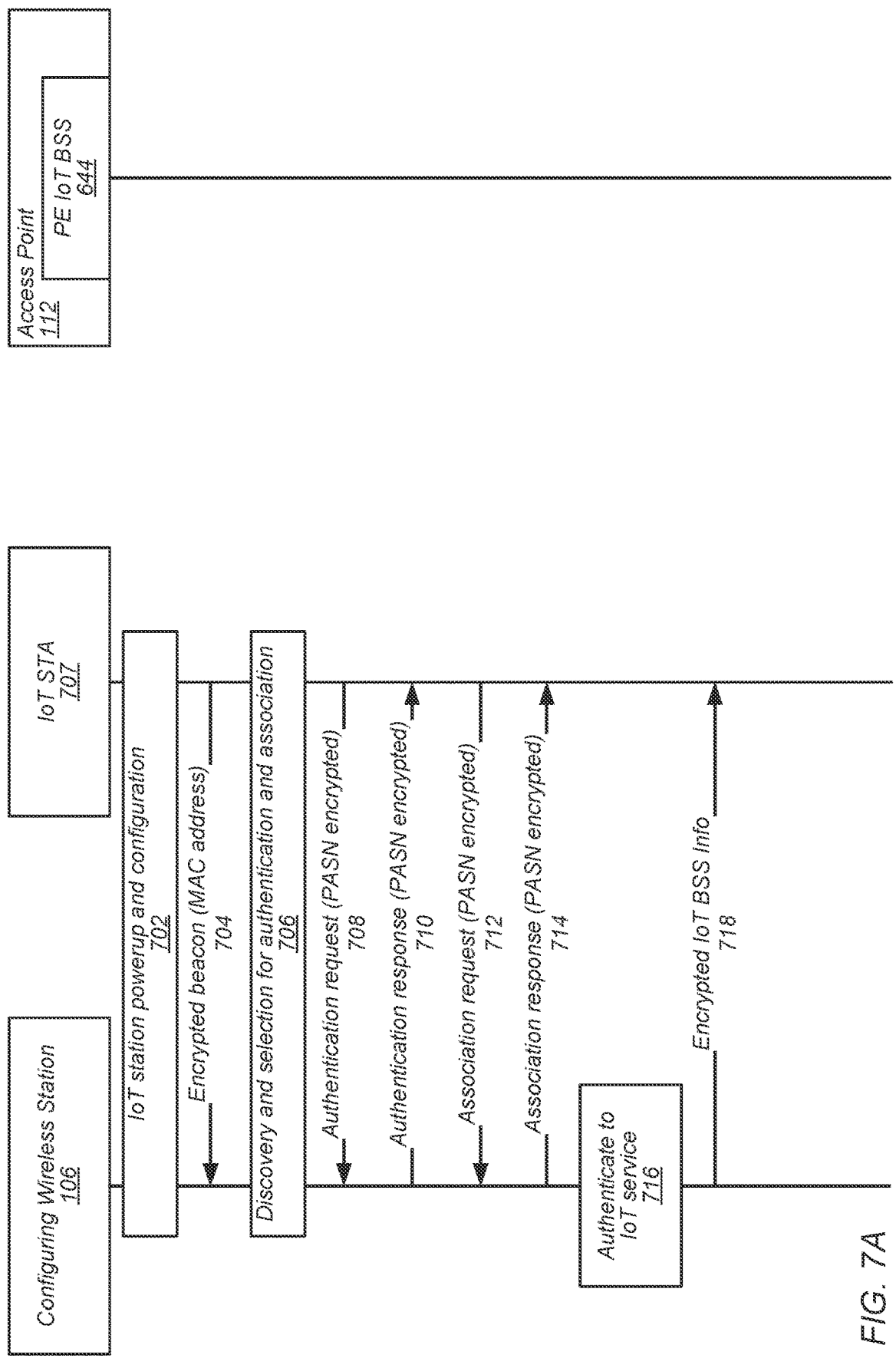
FIG. 7 illustrates an example of signaling for an IoT device configuration to a PE BSS, according to some embodiments.
Figure 7B:
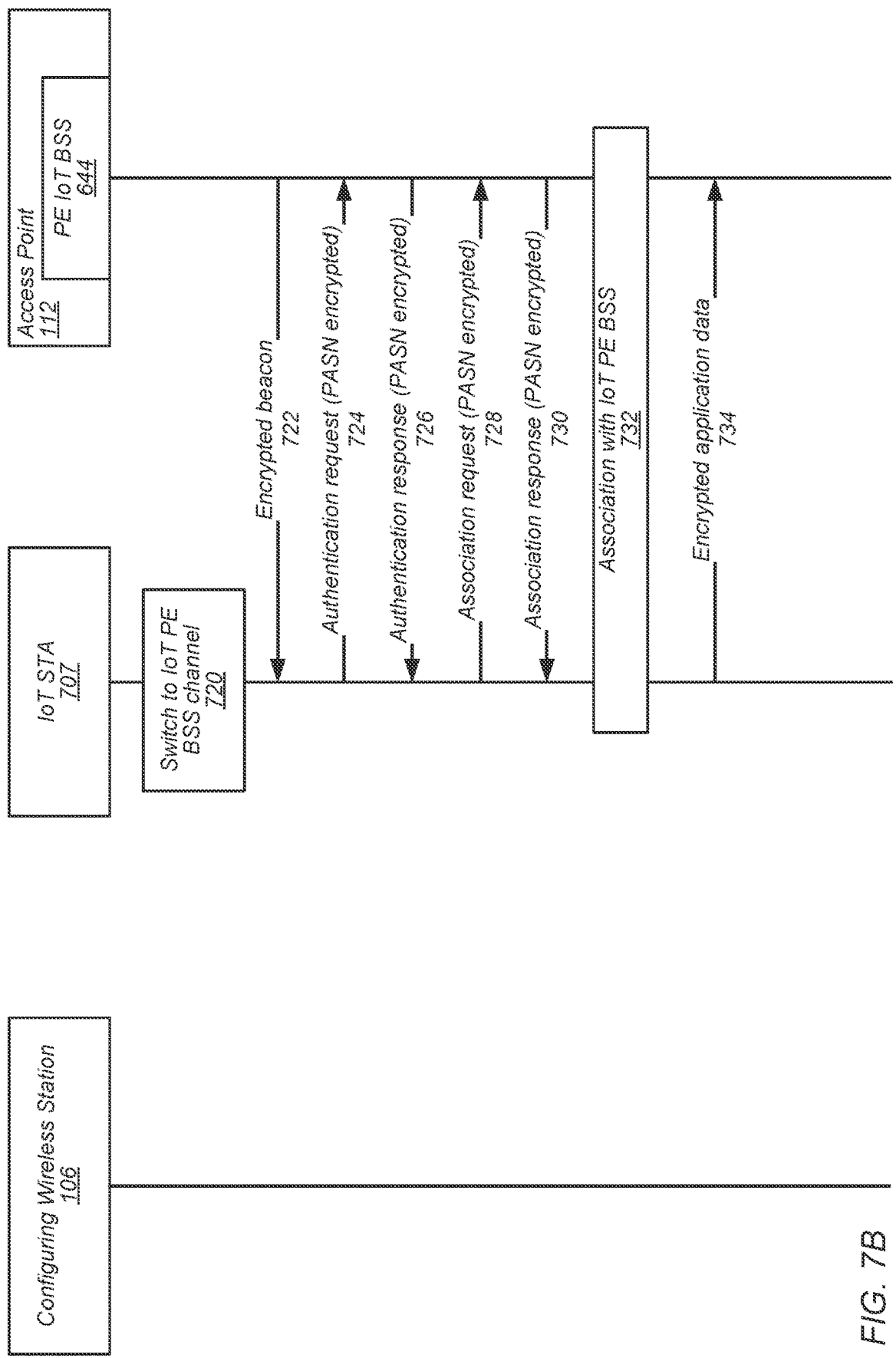

FIGS. 7A and 7B illustrate an example of signaling for an IoT device configuration to a PE BSS, according to some embodiments. The signaling shown in FIG. 7 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

Turning to FIG. 7A, at 702, an IoT station 707, which may be an IoT station 107, may be powered on and may configure itself to operate in PE BSS mode. Additionally, a configuring wireless station 106, may launch an application that knows a MAC address key of an PE IoT BSS, such as PE IoT BSS 644 and is able to discover the PE IoT BSS 644. The configuring wireless station 106 may receive an encrypted beacon 704 from the IoT station 707 with a randomized MAC address of the IoT station 707. Then, at 706, the configuring wireless station 106 may discover the PE IoT BSS 644 of the IoT station 707 and an end user of the configuring wireless station 106 may select to authenticate and associate with the PE IoT BSS 644 of the IoT station 707. Further, the configuring wireless station 106 may authenticate and associate with the IoT station 707 using, for example, a pre-association security protocol. For example, the configuring wireless station 106 may perform a 4-way PASN encrypted handshake with the IoT station 707 via messages 708, 710, 712, and 714 to authenticate and associate with the IoT station 707. As another example, the configuring wireless station 106 may use a public key to protect identifiers, e.g., such as an Identifier Protection Key (IPK) to securely authenticate and associate with the IoT station 707 and/or the configuring wireless station 106 may perform a faux (or dummy) association with IoT station 707 to establish security (e.g., encryption) prior to performing an actual association that is protected (e.g., encrypted). At 716, the configuring wireless station 106 has authenticated and associated with the IoT station 707 and provides the IoT station 707 specific information while making necessary authentications to an IoT service. Further, the configuring wireless station 106 may provide PE IoT BSS information to the IoT station 707 via encrypted data frame 718.

Turning to FIG. 7B, at this point, the IoT station 707 knows the channel of the PE IoT BSS 644 and, at 720, the IoT station 707 may switch to the channel of the PE IoT BSS 644. The IoT station 707 may receive an encrypted beacon 722 from the PE IoT BSS 644 and may authenticate and associate with the PE IoT BSS 644 using, for example, a pre-association security protocol. For example, the IoT station 707 may perform a 4-way PASN encrypted handshake with the PE IoT BSS 644 via messages 724, 726, 728, and 730 to authenticate and associate with the PE IoT BSS 644. As another example, the IoT station 707 may use a public key to protect identifiers, e.g., such as an Identifier Protection Key (IPK) to securely authenticate and associate with the PE IoT BSS 644 and/or the IoT station 707 may perform a faux (or dummy) association with PE IoT BSS 644 to establish security (e.g., encryption) prior to performing an actual association that is protected (e.g., encrypted). At 732, the IoT station 707 has associated with the PE IoT BSS 644 and may authenticate with an IoT server via the Internet. Further, the IoT station 707 may begin to operate as programmed. Thus, the IoT station 707 may transmit encrypted application data 734 to the PE IoT BSS 644.

In some instances, a WLAN device (e.g., a wireless station, such as wireless station 106, and/or a mobile access point, such as access point 112), may transition to (e.g., operate, at least in some instances, as) a mobile access point. The mobile access point may have short operating times and may stop its operation, e.g., if the mobile access point has no uplink or downlink data for a period of time and/or to (aggressively) save power. Additionally, the mobile access point may switch to a discoverability mode if the mobile access point senses other wireless stations in proximity, has been requested to do so by an associated PE wireless station through a management frame, senses many scanning frames, and/or is activated by the end user. Note that when activated, the mobile access point may operate as a PE BSS using the principles, methods, and mechanisms described herein.

Figure 8:
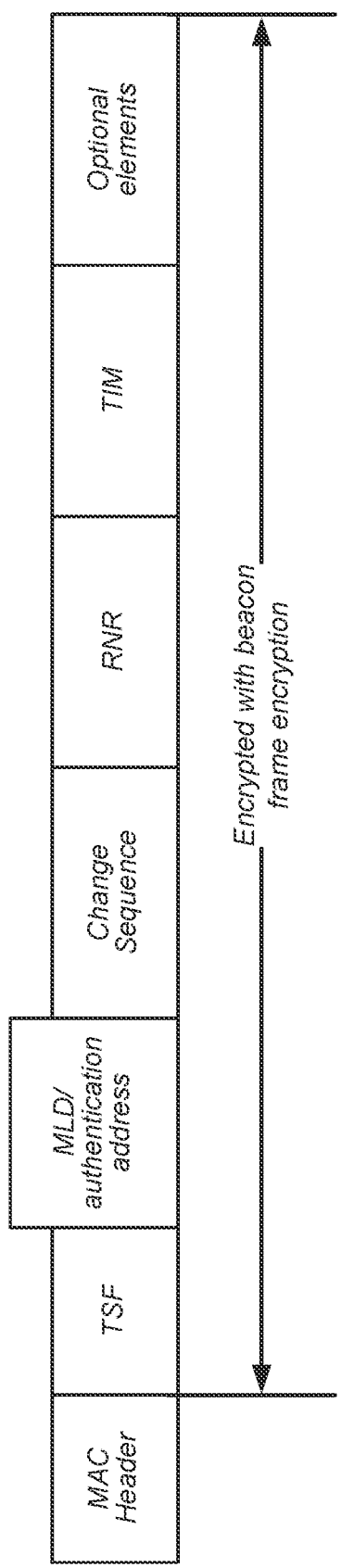
FIG. 8 illustrates an example format of an encrypted beacon frame, according to some embodiments.

FIG. 8 illustrates an example format of an encrypted beacon frame, according to some embodiments. Note that a PE access point (e.g., such as access point 112) may transmit encrypted beacons for a PE BSS. The encrypted beacons may be encrypted by a BSS specific beacon key. Additionally, encrypted beacons may contain minimum (and/or minimal) information in order to maintain associations, e.g., goal is to minimize a size of the encrypted beacon. An associated PE wireless station (e.g., such as wireless station 106) may store long term beacon keys to receive the encrypted beacon from the PE access point (e.g., PE BSS). Note that beacon keys may enable beacon reception, e.g., passive PE BSS discovery, which may be required for association to the PE BSS. As shown, an encrypted beacon frame may include a MAC header field, a timing synchronization function (TSF) field, a multi-link device (MLD)/authentication address field, a reduced neighbor report (RNR) field, a traffic indication map (TIM) field, a change sequence field, a management message integrity check (MIC) element (MME), and other various optional elements. The MAC header may include a transmitter address and/or access point MAC address for detection of the transmitter of the frame. Note that the MAC address may be randomized. The TSF field may support synchronization maintenance with the access point. The MLD/authentication address field may include the access point's authentication address. The RNR field may support detection of other suitable access points in proximity to the access point and/or to maintain access point MLD links with other affiliated access points. The TIM field may indicate whether the access point has buffered unicast and/or groupcast frames for the wireless station. The change sequence field may signal whether the PE BSS has a critical parameter update. The MME field may include an integrity check sum of the beacon frame content. The various optional elements may include critically updated elements that may be included in the beacon, thereby avoiding probe responses.

In some instances, to detect a PE BSS from an encrypted beacon, a PE wireless station, such as wireless station 106, may check from an over-the-air (OTA) BSSID of a PE access point, such as access point 112, whether the PE wireless station knows the PE BSS. For example, a non-access point PE wireless station (e.g., wireless station 106), may store an access point address resolution key (ARK) key, an AP authentication address, an SSID, a PMKID, an authentication key, an authentication mode, and/or an access point pre-shared key. Thus, the PE wireless station may have stored an ARK and may use the ARK to determine whether the PE access point is a known PE access point. As an example, if a check sum is equivalent to (and/or equals) an ARK of random bits, then the PE wireless station may confirm the PE access point is a known PE access point. Further, if the PE access point is detected, then the PE wireless station may continue to authenticate and associate with the PE access point, e.g., by using the stored parameters. In some instances, the ARK key may be extended service set (ESS) wide. Thus, if a PE access point's OTA BSSID matches, then PE wireless station may easily calculate whether other APs belong to the ESS.

Figure 9:
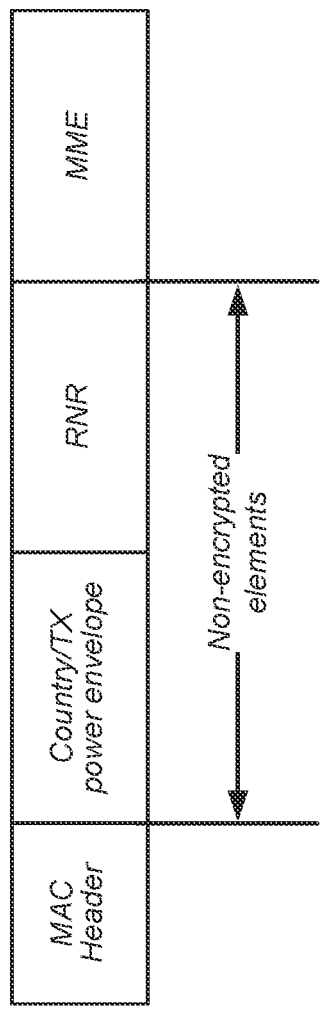
FIG. 9 illustrates an example of a discovery beacon frame, according to some embodiments.

In some instances, a PE access point, such as access point 112, may transmit discovery beacons, e.g., as illustrated by FIG. 9, to advertise PE BSSs it operates to PE wireless stations, such as wireless station 106, that do not have beacon keys. Note that all PE wireless stations may receive discovery beacons. As shown by FIG. 9, a discovery beacon may include a minimal set of elements, e.g., as compared to the encrypted discovery beacon described in reference to FIG. 8, to allow discovery of the advertised PE BSS(s). For example, the discovery beacon may include a MAC header field, a country and/or transmission power envelope field, an RNR field, and/or an MME field. The MAC address included in the MAC header field may be randomized. The MAC header field may include a transmitter address and/or access point MAC address for detection of the transmitter of the frame. The country and/or transmission power envelope field may include elements required for the PE wireless station to calculate a regulatory maximum transmission power. The RNR field may support detection of the transmitting PE access point as well as other suitable access points in proximity to the transmitting PE access point. Thus, the RNR field may also contain information for one or more legacy and PE BSSs in the same band/channels and/or in other band/channels as the transmitting PE access point. Note that the RNR field may be the main content of the discovery beacon. The MME field may include an integrity check sum of the beacon frame content. In addition, a complete set of BSS parameters may be obtained through active scanning. In some instances, the discovery beacon may contain the PE BSS information in a non-encrypted format. Further, the elements included in the discovery beacon may allow PE BSS discovery for all non-associated wireless stations that receive the discovery beacon.

In some instances, the RNR element of the encrypted beacon frame and/or the discovery frame may include a neighbor access point information field. The neighbor access point information field may include various fields and, in particular, may include a target beacon transmission time (TBTT) information field. As illustrated by FIG. 10A, the TBTT information field may in turn include various fields such as a neighbor access point (AP) TBTT offset field, a BSSID field, a short SSID field, a BSS parameters field, a 20 MHz power spectral density (PSD) field, and an MLD parameters field. The BSSID field may provide a transmitting access point's MAC address, e.g., a MAC address that is transmitted over-the-air. Note that the MAC address provided in the BSSID field may not be the MAC address used for authentication. The short SSID field may be a 4-octets long hash sum of the SSID. Note that in a discovery beacon and/or for a discoverable PE BSS, the short SSID field may be used for BSS discovery. In addition, as shown in FIG. 10B, the BSS parameters field may in turn include various fields such as an OCT recommended field, a same SSID field, a multiple BSSID field, a transmitted BSSID field, a member of ESS with 2.4/5 GHz co-located AP field, an unsolicited probe response active field, a co-located AP field, and/or a reserved field. In some instances, a PE BSS may set the same SSID field, multiple BSSID field, transmitted BSSID field, and/or the co-located AP field to a value of 0 to protect PE BSS privacy and to not provide all information for the PE BSS. In other words, to protect PE BSS privacy and to partially hide information associated with the PE BSS, the PE BSS may set the value of these fields to zero when they would otherwise be one. Further, as shown in FIG. 10C, the MLD parameters field may in turn includes various fields such as an MLD identifier (ID) field, a link ID field, a change sequence field, a PE AP field, and a reserved field. Note that the PE AP field, which may be one bit in length, may be set to a value of one to indicate that a reported AP is privacy enhanced and set to zero otherwise.

In some instances, a number of transmitted encrypted beacons and/or discovery beacons may be controlled and/or limited. For example, as illustrated by FIG. 11A, an access point (AP), such as access point 112, with PE BSS may transmit encrypted beacons for a first period of time and then interleave discovery beacons with encrypted beacons for a second period of time. Note that such operations may repeat periodically. Note that the PE access point may only be discoverable for non-access point wireless stations when transmitting discovery beacons (e.g., during the second period of time). Thus, the PE access point may only be discoverable by previously associated non-access point wireless stations when it is only transmitting encrypted beacons (e.g., during the first period of time). Further, as illustrated by FIG. 11B, an access point operating both a PE BSS and a legacy BSS may interleave encrypted beacons with legacy beacons that do not contain PE access point information for a first period of time and then interleave encrypted beacons with legacy beacons that do contain PE access point information for a second period of time. Note that the PE access point may only be discoverable for non-access point wireless stations when transmitting legacy beacons with the PE access point information (e.g., during the second period of time). Thus, the PE access point may only be discoverable by previously associated non-access point wireless stations when it is transmitting legacy beacons without the PE access point information (e.g., during the first period of time). Note that the beacon transmission interval illustrated in FIGS. 11A and 11B is exemplary only. Note further that discovery beacons may be transmitted more or less frequently than legacy beacons. For example, the discovery beacon may be transmitted as an unsolicited broadcast probe response, e.g., once every 20 TUs and/or at some other interval. In addition, note that the encrypted beacon transmission interval may change, e.g., depending on access point needs and/or requirements to randomize beacon transmission intervals.

Figure 12A:
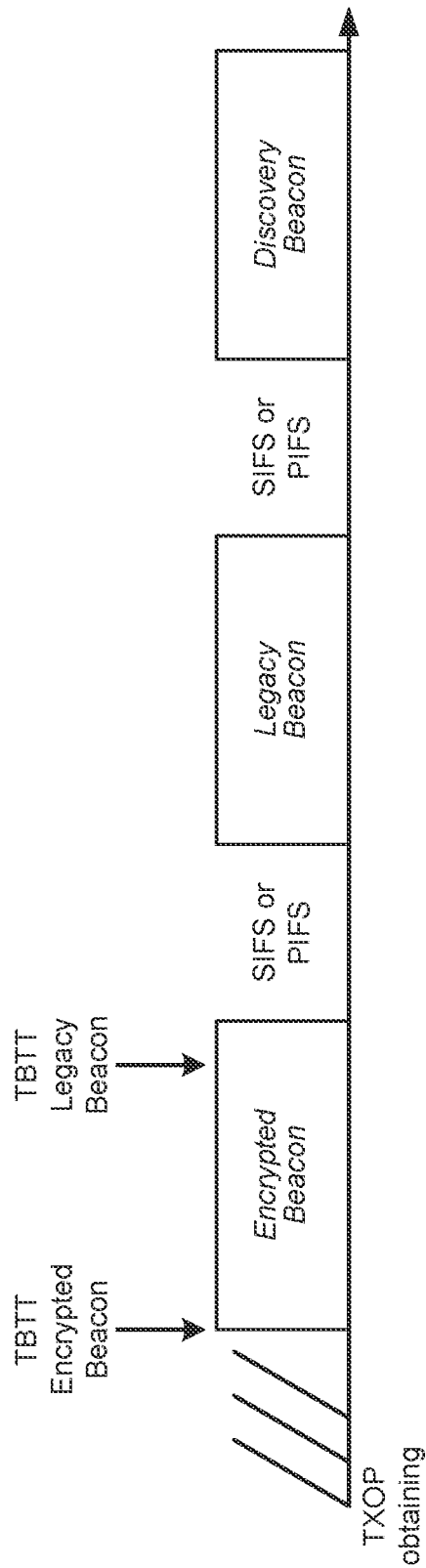
FIGS. 12A, 12B, 12C, and 12D illustrate examples of encrypted beacon and discovery beacon transmissions in transmission opportunities, according to some embodiments.

In some instances, for example as illustrated by FIG. 12A, beacon frames may be transmitted separately inside a transmission opportunity. Thus, as shown, once a transmission opportunity (TXOP) has been obtained, an encrypted beacon, legacy beacon, and discovery beacon may be transmitted in any order. As shown, the encrypted beacon is transmitted first at its TBTT followed by the legacy beacon (transmitted after its TBTT), and the discovery beacon, which may not have an associated TBTT, however, as noted, the order of transmission can vary.

Figure 12B:
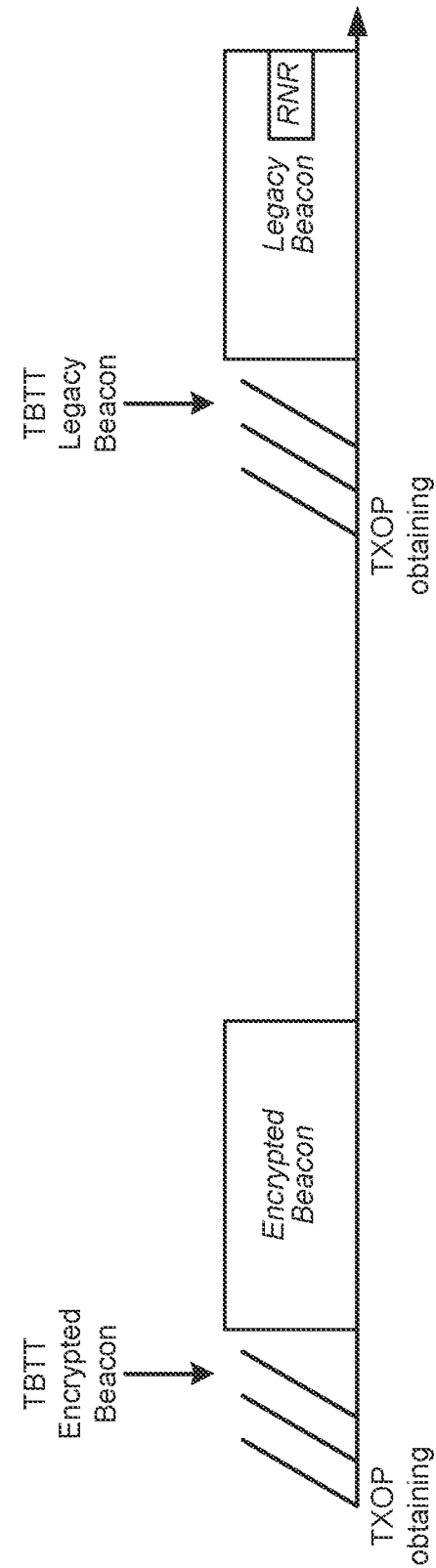

In some instances, for example, as illustrated by FIG. 12B, PE BSS discovery information may be transmitted in an RNR of a legacy beacon and each beacon (e.g., an encrypted beacon and a legacy beacon with PE BSS discovery information in the RNR) may be transmitted in dedicated transmission opportunities. Thus, as shown, once a first transmission opportunity (TXOP) has been obtained, an encrypted beacon may be transmitted at or after its associated TBTT. Then, once a second transmission opportunity (TXOP) has been obtained, a legacy beacon with PE BSS discovery information in its RNR may be transmitted at or after its associated TBTT.

Figure 12C:
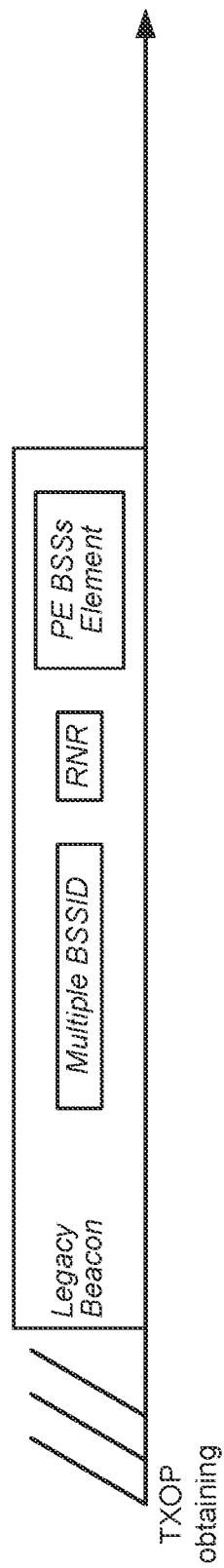

In some instances, for example, as illustrated by FIG. 12C, a legacy beacon with multiple BSSID for a legacy BSS, an RNR for legacy BSS and PE BSS discovery, and PE BSSs element for PE BSSs may be transmitted once a transmission opportunity (TXOP) has been obtained.

Figure 12D:
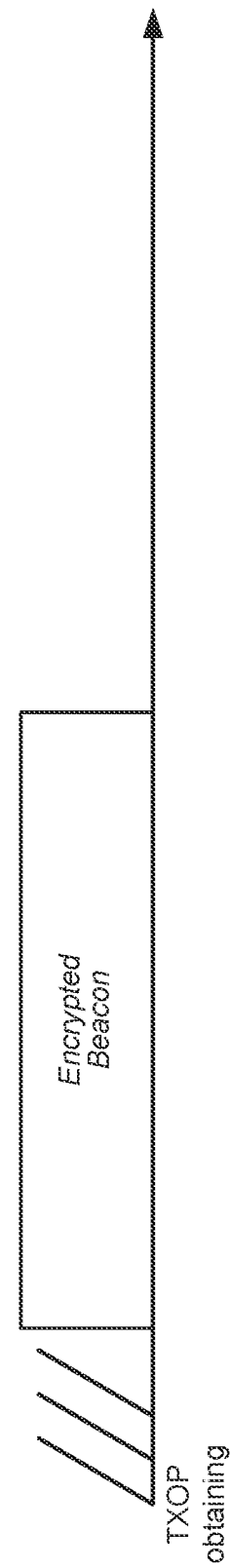

In some instances, for example, as illustrated by FIG. 12D, an encrypted beacon with multiple BSS information may be transmitted once a transmission opportunity (TXOP) has been obtained.

Figure 13:
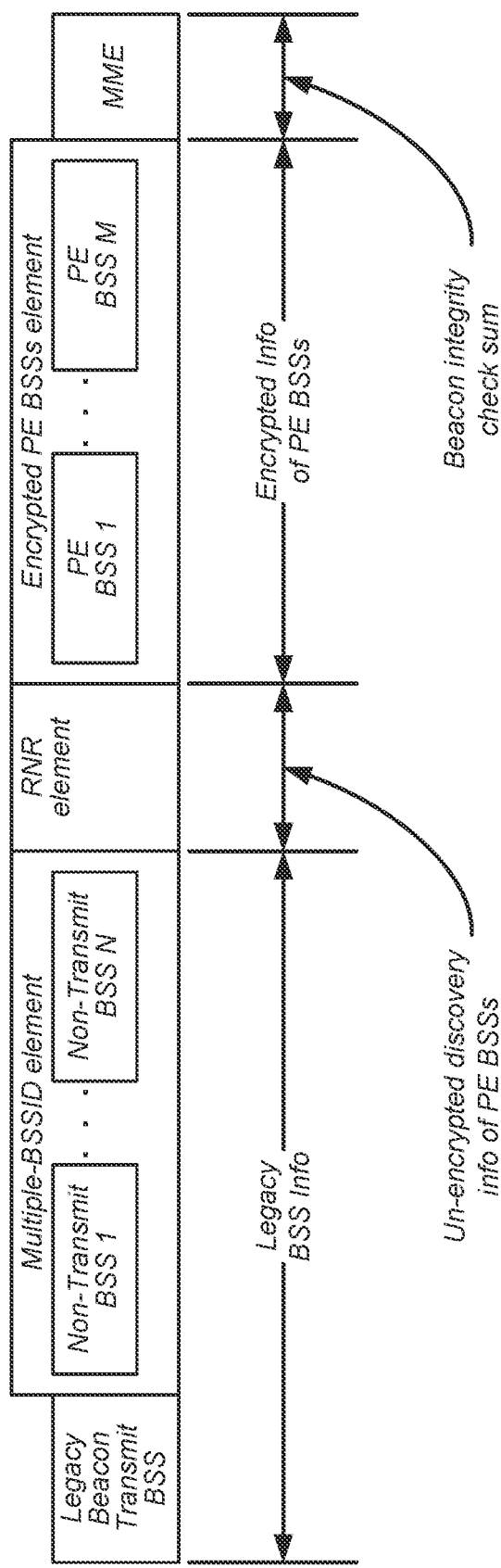
FIGS. 13 and 14 illustrate examples of an enhanced legacy beacon frame, according to some embodiments.

In some instances, a legacy beacon frame may be enhanced to support multiple PE BSS. For example, as illustrated by FIG. 13, a beacon frame may include legacy BBS information such as legacy beacon transmit BSS and multiple-BSSID element including non-transmit BSSs, un-encrypted discovery information of PE BSSs such as an RNR element, encrypted information of PE BSSs such as an encrypted PE BSSs element including PE BSSs, and a beacon integrity check sum that may include an MME. Note that the RNR The RNR may include legacy BSSs and discoverable PE BSSs. In addition, the encrypted PE BSSs element may be added to a legacy beacon format. The PE BSSs element may include one or more PE BSS beacon content.

Additionally, extended capabilities may be set to 1 to signal the encrypted PE BSSs element presence. Further, the MIC Management Element (MME) may be calculated over the entire beacon frame. For the beacon integrity check calculation, all BSSs may have the same key value to verify the MME element content.

Figure 14:
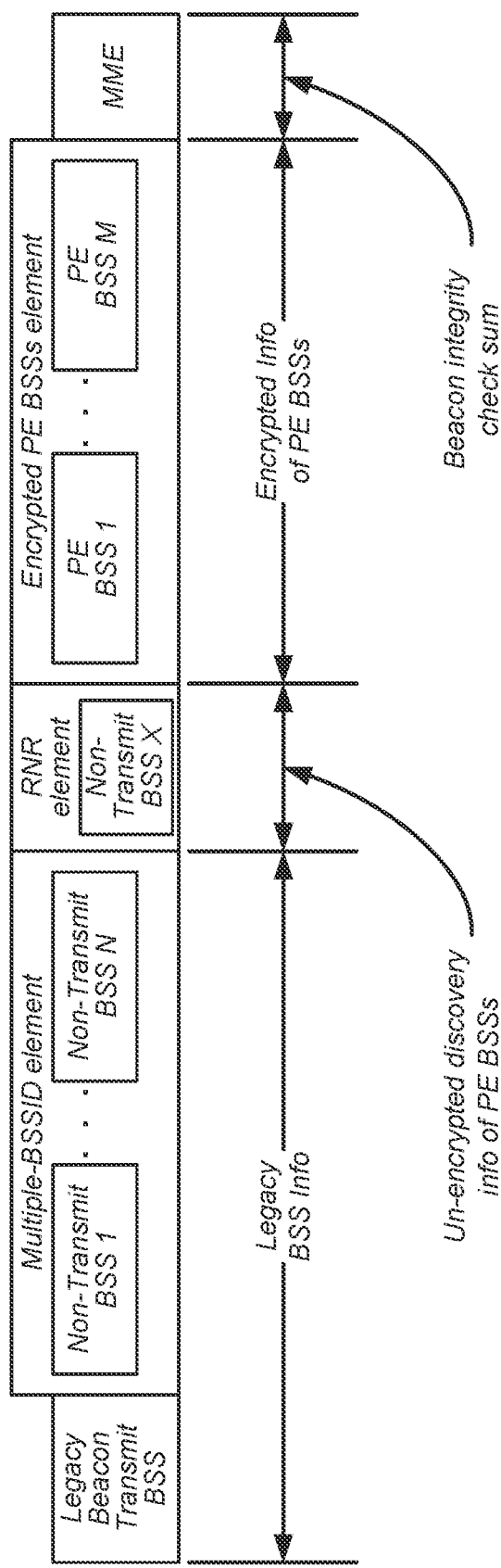

In some instances, to reduce legacy beacon frame size, some of the non-transmitted BSSs may be included only in an RNR element, e.g., as illustrated by FIG. 14. In some instances, such a beacon may or may not have a multiple BSSID element. Additionally, the RNR element may contain non-transmit BSSs with legacy BSS only in RNR field set to 1. Note that setting the legacy BSS only in RNR field to 1 means that non-transmitted BSS is not included to multiple BSSID element and its information may be obtained only through RNR. As shown, such a beacon frame may include legacy BBS information such as legacy beacon transmit BSS and multiple-BSSID element including non-transmit BSSs, un-encrypted discovery information of PE BSSs such as an RNR element that may contain non-transmit BSS information, encrypted information of PE BSSs such as an encrypted PE BSSs element including PE BSSs, and a beacon integrity check sum that may include an MME. Further, the MIC Management Element (MME) may be calculated over the entire beacon frame. For the beacon integrity check calculation, all BSSs may have the same key value to verify the MME element content.

Figure 15:
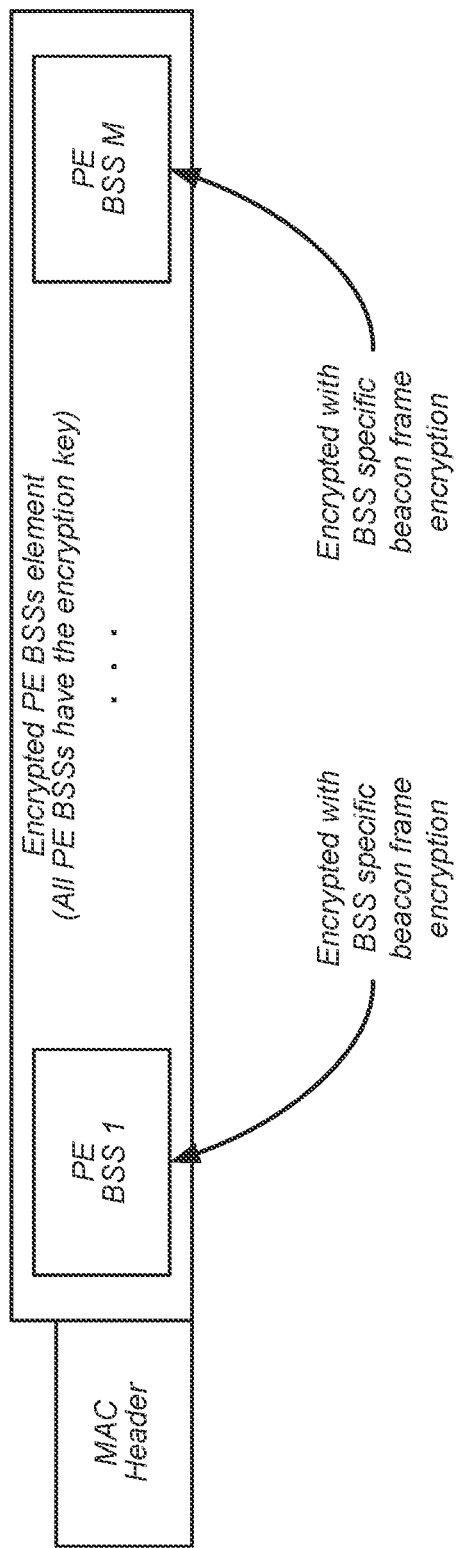
FIG. 15 illustrates an example of an encrypted beacon with multiple PE BSSs, according to some embodiments.

In some instances, a PE access point may host multiple PE BSSs. In such instances, to reduce beaconing overhead, the PE access point may send the same beacon for multiple PE BSSs, for example, as illustrated by FIG. 15. Note that each PE BSS in the encrypted PE BSS element may be encrypted with a PE BSS specific key. Further, after the PE access point has encrypted PE BSSs information, the PE access point may then encrypt the Encrypted BSS element with a common key. The common key may protect the number of PE BSS information or other common information elements. Additionally, all PE BSSs in the Encrypted PE BSSs elements may share the same common encryption key. Further, an ARK of the MAC header's transmitter address may be known to all non-access point wireless stations (e.g., such as wireless station 106) that may associate with a PE BSS in the encrypted beacon.

Figure 16A:
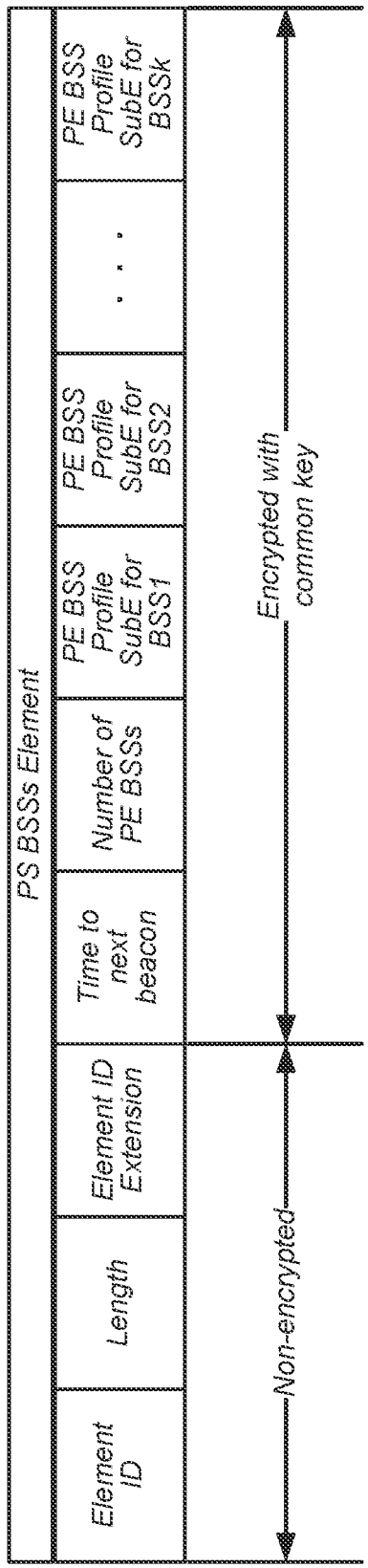
FIG. 16A illustrates an example of an encrypted PE BSS field/element, according to some embodiments.
Figure 16B:
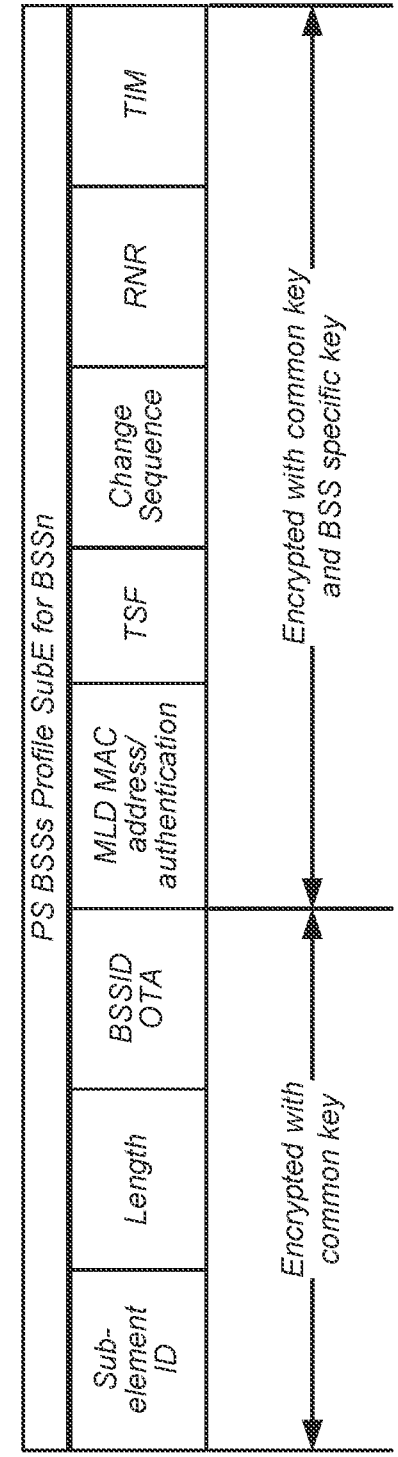
FIG. 16B illustrates an example of a PE BSS profile SubE for BSS field/element, according to some embodiments.

FIG. 16A illustrates an example of an encrypted PE BSS element, according to some embodiments. As shown the encrypted PE BSS element may include non-encrypted fields such as an element ID field, a length field, and an element ID extension field. Additionally, the encrypted PE BSS element may include fields encrypted with a common key, such as a time to next beacon field, a number of PE BSSs field, and one or more PE BSS profile SubE for BSS fields. The number of PE BSSs field may have an integer value presenting the number of listed PE BSSs. The time to next beacon field may indicate a next scheduled beacon transmission time. Note that the PS BSS element may be limited to and/or by a 256-octet payload, at least in some instances. As illustrated by FIG. 16B, each PE BSS profile SubE for BSS field may include fields encrypted with a common key such as a sub-element ID field, a length field, and a BSSID OTA field, and field encrypted with the common key and a BSS specific key such as an MLD MAC address/authentication field, a TSF field, a change sequence field, an RNR field, and a TIM field. The BSSID OTA field may include and/or indicate an access point MAC address transmitted over-the-air. The MLD MAC address/authentication address field may include and/or indicate an access point address that is used in authentication. Note that the over-the-air BSSID may not be used directly with the access point. The TSF field may be a TSF of the PS BSS and may be used in scheduled transmissions in PE BSS. Note, that beacon transmissions may have a different TSF and interval. The change sequence field may include and/or indicate last updated parameters in the BSS. The RNR field may include RNR elements for each BSS and a PE wireless station may not be aware of other PE BSSs RNRs. The TIM field may include a TIM for each BSS and a PE wireless station may not be aware of other PE BSSs buffered traffic.

Figure 17A:
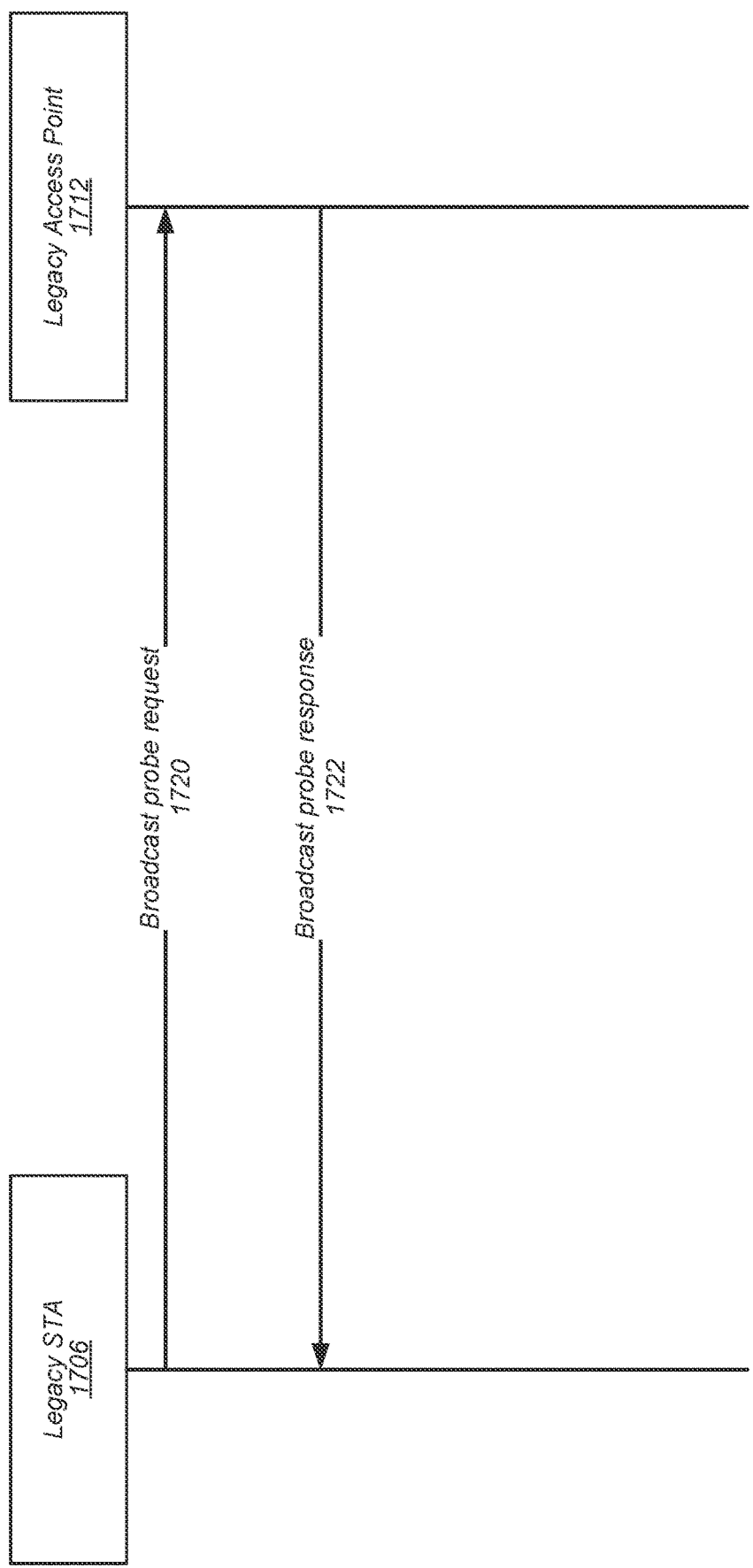
FIGS. 17A, 17B, and 17C illustrate examples of signaling for active scanning, according to some embodiments.

In some instances, a PE wireless station may require a mechanism for fast discovery of available PE access points within its proximity. In some instances, such signaling may be similar to legacy wireless stations' broadcast addressed probe request frame with wildcard SSID element, e.g., as illustrated by FIG. 17A. As shown a legacy STA 1706 may transmit a broadcast probe request 1720 to a legacy AP 1712. The broadcast probe request 1720 may not include a PE AP request field and/or a PE AP request field may be set to a value of 0. The legacy STA 1706 may then receive a broadcast probe response 1722 from the legacy AP. In some instances, a PE access point 112 may respond to broadcast or directed probe requests (without changes or with signaling to request responses from PE BSSs) as well as broadcast or directed PE query requests that request responses from PE BSSs. Note that the query frame may have signaling to further specify desired response types (e.g., encrypted beacon or discovery beacon). Note further that the PE query request frame may be received only by PE BSSs. In some instances, a broadcast PE query request may be transmitted as un-encrypted. However, a unicast PE query request may be encrypted (Robust) if it is addressed to an associated PE BSS but may not be encrypted when addressed to other PE BSSs.

Figure 17B:
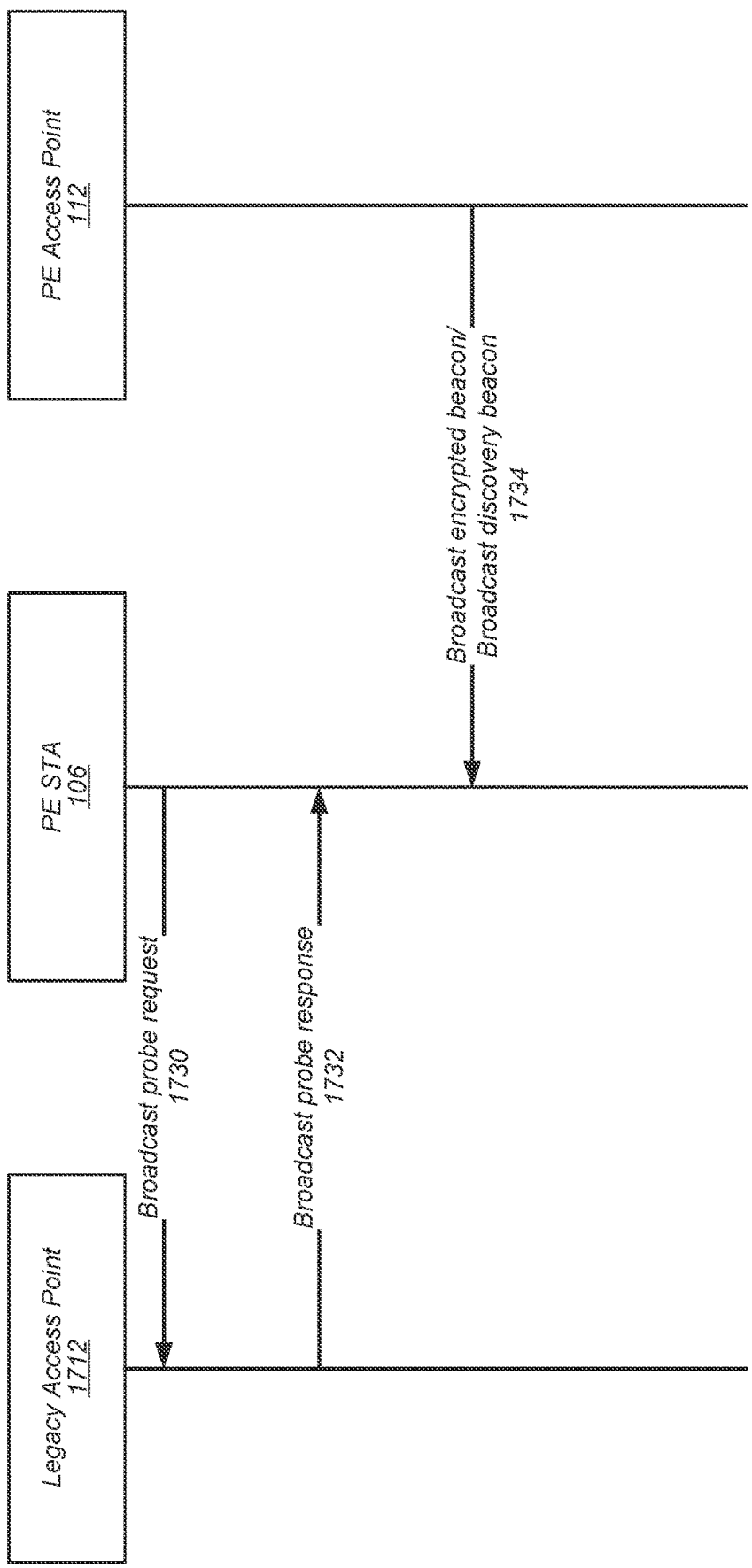

For example, FIG. 17B illustrates an example of active scanning, according to some embodiments. The signaling shown in FIG. 17B may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a PE STA 106 may transmit a broadcast probe request 1730 to a legacy access point 8112. The broadcast probe request 1730 may include a PE AP request field with a value set to 1. The PE STA 106 may receive a broadcast probe response 1732 that includes an indication of and/or information associated with a PE access point 112. Thus, using the indication and/or information included in the broadcast probe response 1732, the PE STA 106 may receive a broadcast encrypted beacon and/or broadcast discovery beacon 1734 from PE access point 112 and begin an association procedure with PE access point 112.

Figure 17C:
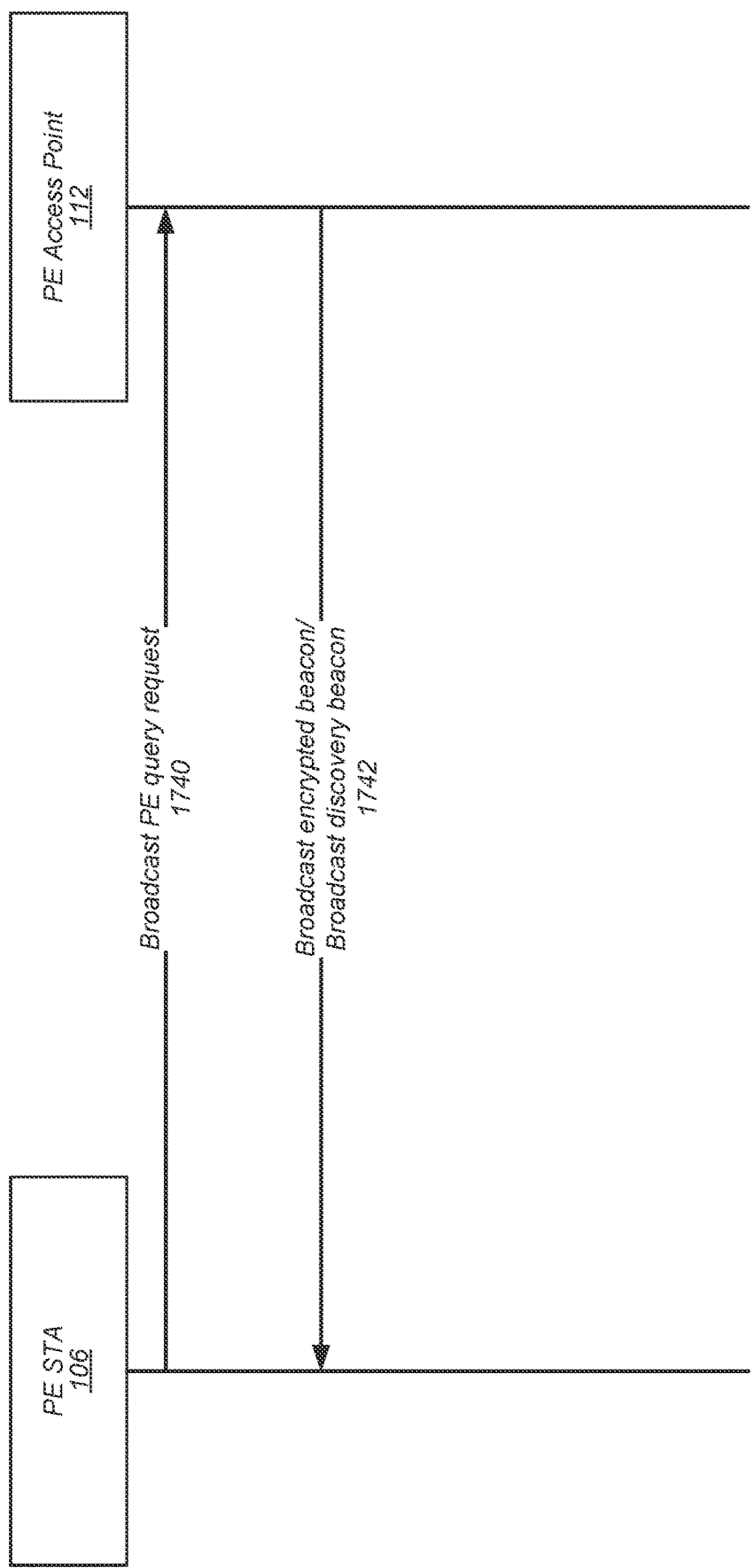

As another example, FIG. 17C illustrates another example of active scanning, according to some embodiments. The signaling shown in FIG. 17C may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a PE STA 106 may transmit a broadcast PE query request 1740 to a PE access point 112. The broadcast PE query request 1740 may be transmitted as un-encrypted. The broadcast PE query request 1740 may request responses from PE BSSs. Additionally, the broadcast PE query request 1740 may be a query frame and may include signaling to further specify a desired response type, e.g., such as encrypted beacon or discovery beacon. Further, the broadcast PE query request 1740 may only be received by PE BSSs. Note that although the broadcast PE query request 1740 may be transmitted as un-encrypted, a unicast PE query request may be encrypted when addressed to an associated or previously associated PE BSS and un-encrypted with addressed to other PE. The PE STA 106 may receive a broadcast encrypted beacon and/or broadcast discovery beacon 1742 from PE access point 112 and begin an association procedure with PE access point 112.

In some instances, a PE query request frame, e.g., such as PE query request 1740, may contain a hash checksum. The hash checksum may identify a station, such as PE STA 106, and/or a requested access point. For example, a PE query request may contain a random ID and a check sum ID of requested BSSs. Note that a PE query transmitter, e.g., such as PE STA 106, may include zero or more sets of random ID and the checksum ID. Note further that a PE query frame format may have a random ID field and multiple check sum IDs. All check sum ID may be calculated from the included random ID field.

In some instances, a PE access point, e.g., such as PE access point 112, may respond to PE query request when the PE access point desires to be discoverable. In some instances, a PE access point may respond with a PE beacon when a random ID and checksum ID included in the PE query request frame match with the PE access point. Note that when the PE access point is identified by the random ID and checksum ID included in the PE query request frame, the PE access point may respond by using a different random ID and checksum ID values in a PE beacon.

In some instances, a legacy BSS may include an RNR including legacy and discoverable PE BSSs in its probe response. Upon receipt, a PE wireless station may send a broadcast PE query request to a PE access point. The PE access point, e.g., the PE BSS, may respond with a discovery beacon or an encrypted beacon. For the discovery beacon, an RNR of the discovery beacon may include PE BSSs and legacy BSSs information and may be transmitted as a response to a probe request to shorten overhead of probe responses. For the encrypted beacon, it may contain and/or include the same content as if it was transmitted after a TBTT as the BSSs continue to send encrypted beacons normally. The encrypted beacon may be considered a solicited encrypted beacon. Note that in some instances, a PE BSS may send unsolicited beacons, e.g., if the PE BSS determines that PE BSSs need to be more discoverable.

Figure 18A:
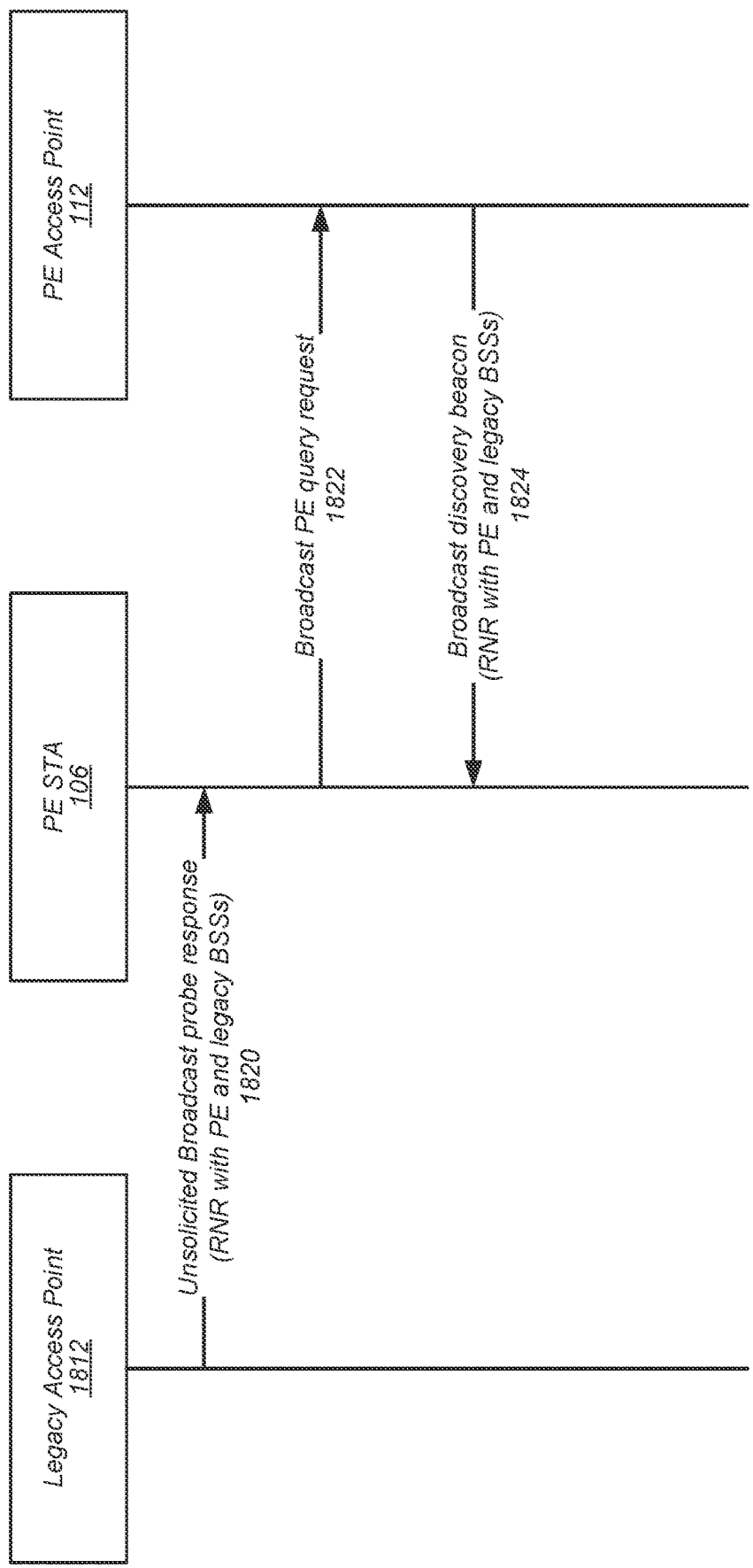
FIGS. 18A, 18B, and 18C illustrate examples of signaling for a broadcast PE BSS probe and/or query, according to some embodiments.
Figure 18B:
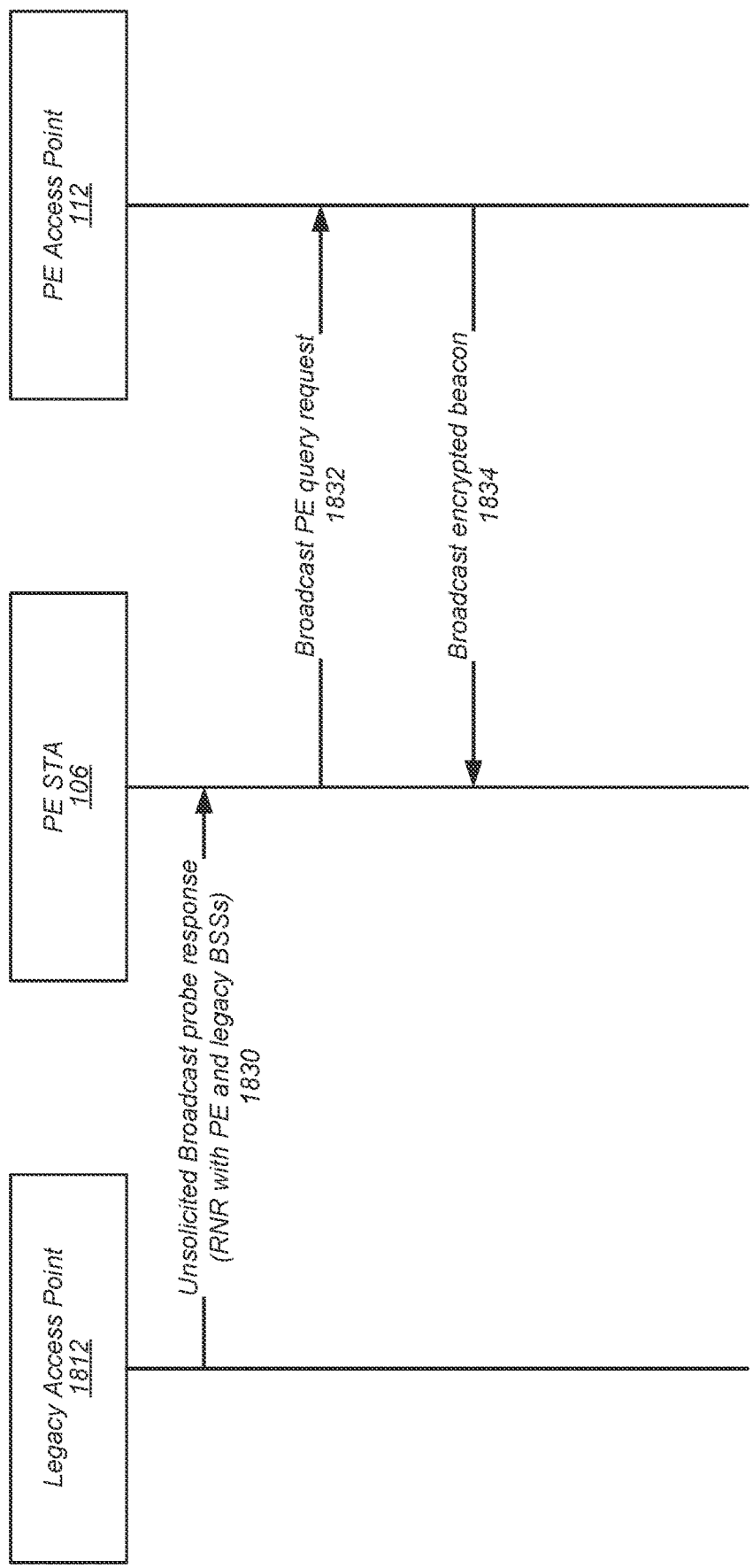
Figure 18C:
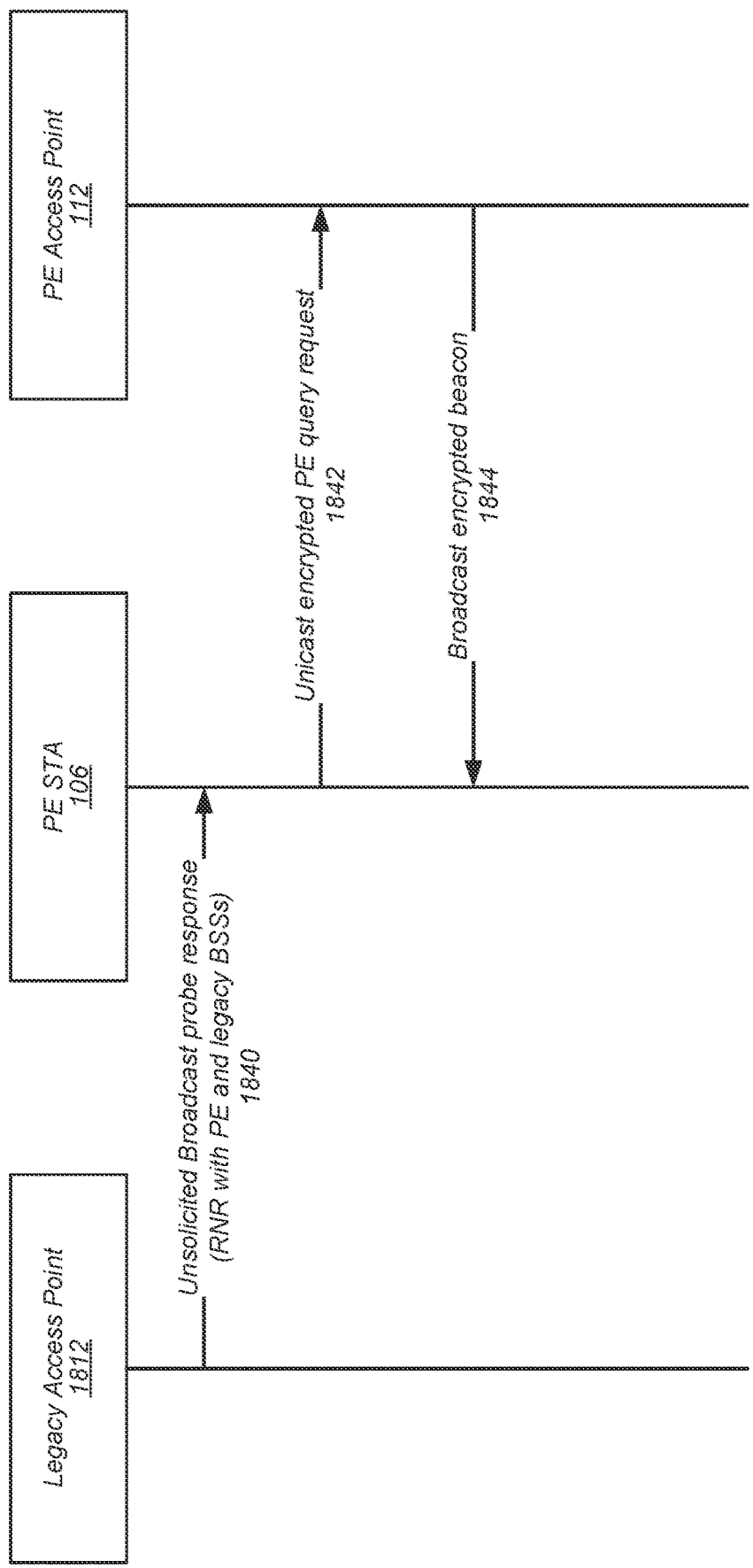

FIGS. 18A, 18B, and 18C illustrate examples of signaling for a broadcast PE BSS probe and/or query, according to some embodiments. The signaling shown in FIGS. 18A, 18B, and 18C may be used in conjunction with any of the systems, methods, or devices shown in the Figures, among other devices. In various embodiments, some of the signaling shown may be performed concurrently, in a different order than shown, or may be omitted. Additional signaling may also be performed as desired.

Turning to FIG. 18A, as shown, this signaling may flow as follows. Initially, a PE STA 106 may receive an unsolicited broadcast probe response 1820 from a legacy access point 1812. The unsolicited broadcast probe response 1820 may include an RNR element/field that indicate both legacy and PE BSSs. Then, based on the unsolicited broadcast probe response 1820, the PE STA 106 may transmit a broadcast PE query request 1822 to a PE access point 112, which may have been indicated in the RNR element/field. The PE STA 106 may receive a broadcast discovery beacon 1824 from PE access point 112. The broadcast discovery beacon 1824 may include an RNR with both PE and legacy BSSs. Upon receipt, the PE STA 106 may begin an authentication and association procedure with PE access point 112.

Turning to FIG. 18B, shown, this signaling may flow as follows. Initially, a PE STA 106 may receive an unsolicited broadcast probe response 1830 from a legacy access point 1812. The unsolicited broadcast probe response 1830 may include an RNR element/field that indicate both legacy and PE BSSs. Then, based on the unsolicited broadcast probe response 1830, the PE STA 106 may transmit a broadcast PE query request 1832 to a PE access point 112, which may have been indicated in the RNR element/field. The PE STA 106 may receive a broadcast encrypted beacon 1834 from PE access point 112. Upon receipt, the PE STA 106 may begin an authentication and association procedure with PE access point 112.

Turning to FIG. 18C, shown, this signaling may flow as follows. Initially, a PE STA 106 may receive an unsolicited broadcast probe response 1840 from a legacy access point 1812. The unsolicited broadcast probe response 1840 may include an RNR element/field that indicate both legacy and PE BSSs. Then, based on the unsolicited broadcast probe response 1840, the PE STA 106 may transmit a unicast PE query request 1842 to a PE access point 112, which may have been indicated in the RNR element/field. The unicast PE query request 1842 may be encrypted. The PE STA 106 may receive a broadcast encrypted beacon 1844 from PE access point 112. Upon receipt, the PE STA 106 may begin an authentication and association procedure with PE access point 112.

Figure 19:
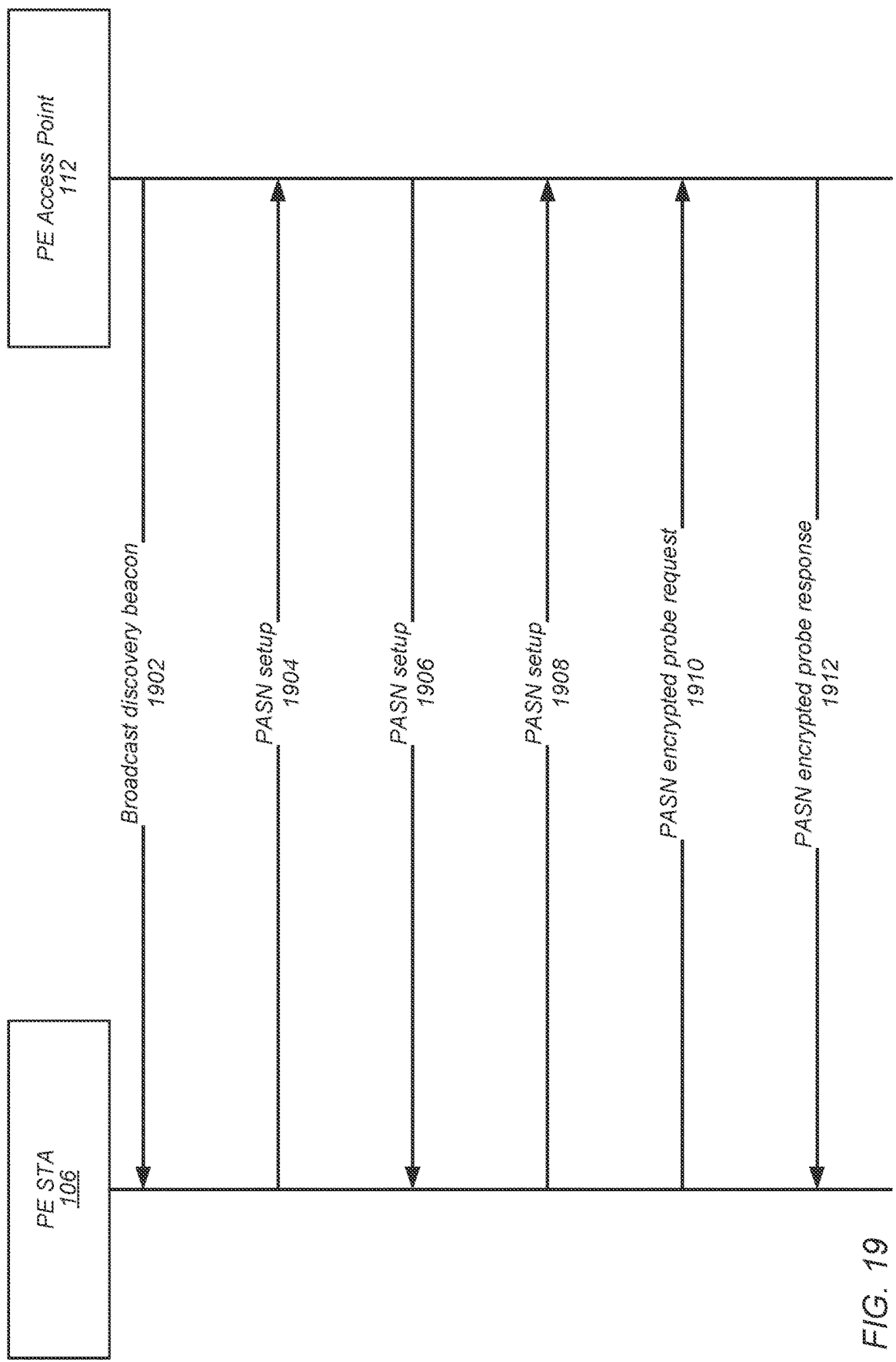
FIG. 19 illustrates an example of signaling for a PE wireless station to associate with a PE access point, according to some embodiments.

FIG. 19 illustrates an example of signaling for a PE wireless station to associate with a PE access point, according to some embodiments. The signaling shown in FIG. 19 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

A PE STA 106, may receive a broadcast discovery beacon 1902 form a PE access point 112. Then, to request more information from the PE BSS hosted by PE access point 112, the PE STA 106 may secure a connection with the PE access point 112 prior to associated. For example, the PE STA 106 may use a pre-association security protocol to secure the connection prior to associating with the PE access point 112. For example, PE STA 106 may use a public key to protect identifiers, e.g., such as an Identifier Protection Key (IPK) to secure the connection prior to associating with the PE access point 112. As another example, the PE STA 106 may perform a faux (or dummy) association to establish security (e.g., encryption) to secure the connection prior to associating with the PE access point 112 and then perform an actual association that is protected (e.g., encrypted). In a further example, as shown, the PE STA 106 may setup PASN protection via signaling 1904, 1906, and 1908. Once PASN protection is setup, the PE STA 106 may transmit a PASN protected probe request or PE query request frame 1910. The PE STA 106 may then receive, from the PE access point 112, a PASN protected probe response that may provide a complete set of PE access point parameters (e.g., PE BSS information). Then, the PE STA 106 may directly associate and receive PE BSS parameters in association signaling with the PE access point 112. Note that the PASN protection may be BSS specific, thus, the PE STA 106 may need to set PASN protection up separately with each scanned BSS.

Figure 20A:
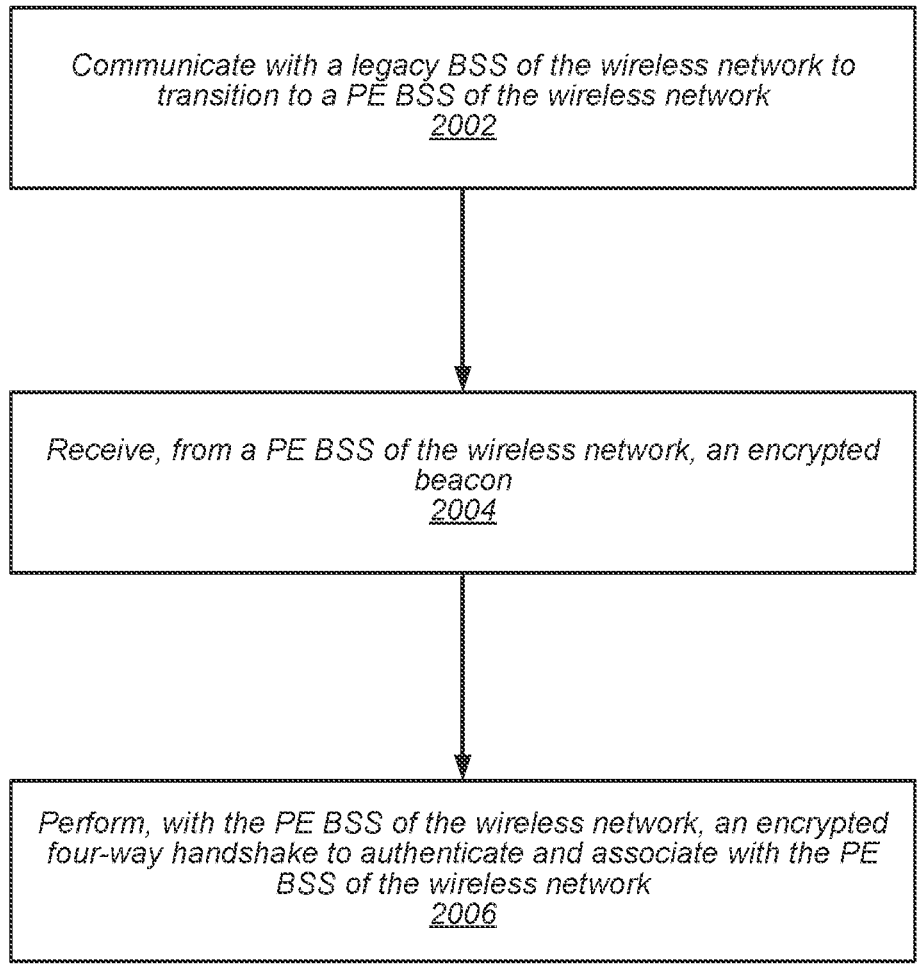
FIGS. 20A and 20B illustrate block diagrams of examples of methods for a wireless station to associate with a PE BSS of wireless network, according to some embodiments.

FIG. 20A illustrates a block diagram of an example of a method for a wireless station to associate with a privacy enhanced (PE) basic service set (BSS) of wireless network, according to some embodiments. The method shown in FIG. 20A may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2002, a wireless station, such as wireless station 106, may communicate with a legacy BSS of the wireless network to transition to a PE BSS of the wireless network. In some instances, to communicate with the legacy BSS of the wireless network to transition to the PE BSS of the wireless network, the wireless station may receive, from the legacy BSS of the wireless network, a beacon indicating that the wireless network supports one or more PE BSSs and may transmit, to the legacy BSS, a robust BSS transition query. The robust BSS transition query may request PE BSS recommendation. Additionally, the wireless station may receive, from the legacy BSS, a robust BSS transition request and may send, to the legacy BSS, a robust BSS transition response indicating a transition to the PE BSS.

The BSS transition request may include a PE BSS candidate list. The PE BSS may be included in the PE BSS candidate list.

At 2004, the wireless station may receive, from a PE BSS of the wireless network, an encrypted beacon. The encrypted beacon may be decoded based on information received from the legacy BSS. The information received from the legacy BSS may include a PE BSS candidate list. The PE BSS candidate list may include a neighbor report and beacon reception parameters. In some instances, the encrypted beacon may be encrypted by a beacon key specific to the PE BSS. In some instances, the encrypted beacon may include one or more of a medium access control (MAC) header field, a timing synchronization function (TSF) field, a multi-link device (MLD)/authentication address field, a reduced neighbor report (RNR) field, a traffic indication map (TIM) field, a change sequence field, a management message integrity check (MIC) element (MME), and/or an optional field. The MAC header may include a MAC address of a transmitter. The MAC address may be randomized. The MLD/authentication address field may include a transmitter's authentication address. The RNR field may include a list of suitable access points in proximity and/or that maintains MLD links with other affiliated access points. The change sequence field may signal whether the PE BSS has a critical parameter update. The MME field may include an integrity check sum of contents of the encrypted beacon frame. The RNR field may include a target beacon transmission time (TBTT) information field. The TBTT information field may include at least a short BSS identifier (ID) field, a BSS parameters field, and/or a multi-link device (MLD) parameters field. The short BSS ID field may be a 4-octets long hash sum of a Service Set Identifier (SSID) associated with the PE BSS. Further, MLD parameters field may include at least a PE access point (AP) field. The PE AP field may be one bit in length. Note that a value of one may indicate that a reported access point is privacy enhanced and a value of zero may indicate that the reported access point is not privacy enhanced.

In some instances, to receive, from the PE BSS of the wireless network, the encrypted beacon, the wireless station may determine, based on an over-the-air BSS identifier (ID), that the wireless station knows the PE BSS. The over-the-air BSS ID may be included in the information received from the legacy BSS. In some instances, to determine, based on an over-the-air BSS identifier (ID), that the wireless station knows the PE BSS, the wireless station may calculate a check sum of the encrypted beacon and determine that the check sum is equivalent to an access point address resolution key (ARK). The ARK may be included in information received from the legacy BSS.

At 2006, the wireless station may perform, with the PE BSS of the wireless network, an encrypted handshake procedure (e.g., such as a multi-way handshake that includes two or more exchanges between participating devices, such as a four-way handshake) to authenticate and associate with the PE BSS of the wireless network. In some instances, to perform, with the PE BSS of the wireless network, the encrypted handshake procedure to authenticate and associate with the PE BSS of the wireless network, the wireless station may transmit, to the PE BSS, an encrypted authentication request and receive, from the PE BSS, an encrypted authentication response. In addition, the wireless station may transmit, to the PE BSS, an encrypted association request and receive, from the PE BSS, an encrypted association response.

In some instances, an access point, such as access point 112, of the wireless network may host the legacy BSS and the PE BSS. In addition, the access point may host one or more additional PE BSSs. Note that the PE BSS and the one or more additional PE BSSs may each have a unique security domain. Note further that the PE BSS and the one or more additional PE BSSs may each have a unique security key. In some instances, the one or more additional PE BSSs include at least one of a PE guest BSS, a PE Internet of Things (IoT) BSS, a PE backbone mesh BSS, or a PE service BSS. In some instances, the PE IoT BSS may operate as a hidden network. In some instances, the PE backbone mesh BSS may operate as a hidden network. In some instances, the PE service BSS may only be discoverable by wireless stations that have an application or configuration to operate in the PE service BSS. Further, in some instances, the access point may host one or more additional legacy BSSs. The one or more additional legacy BSSs may include at least one of a legacy guest BSS, a legacy Internet of Things (IoT) BSS, a legacy backbone mesh BSS, or a legacy service BSS.

Figure 20B:
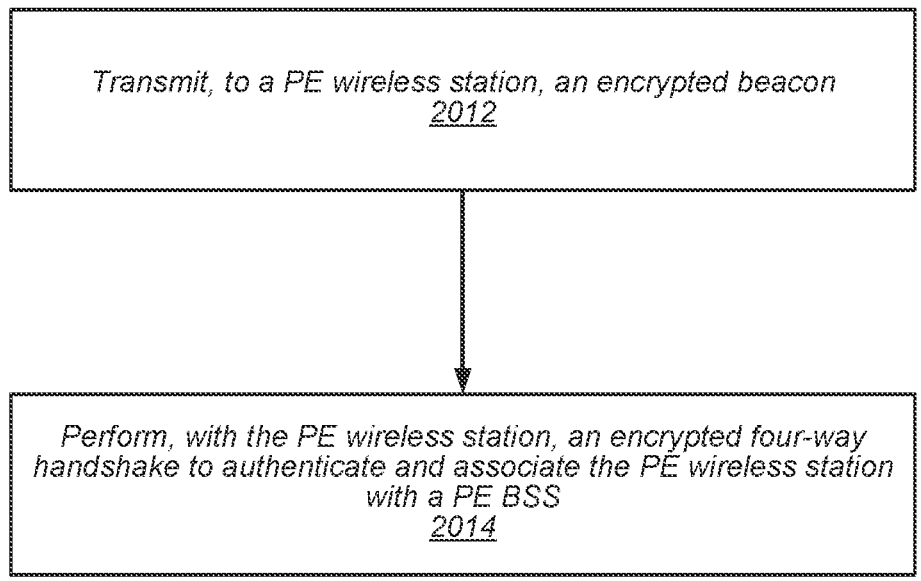

FIG. 20B illustrates a block diagram of another example of a method for a wireless station to associate with a privacy enhanced (PE) basic service set (BSS) of wireless network, according to some embodiments. The method shown in FIG. 20B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2012, an access point, such as access point 112, hosting a PE BSS, may transmit, to a PE wireless station, an encrypted beacon. The encrypted beacon may be decoded based on information received from a legacy BSS. The encrypted beacon may be encrypted by a beacon key specific to the PE BSS. The information received from the legacy BSS may include a PE BSS candidate list. The PE BSS candidate list may include a neighbor report and beacon reception parameters. In some instances, the encrypted beacon may be encrypted by a beacon key specific to the PE BSS. In some instances, the encrypted beacon may include one or more of a medium access control (MAC) header field, a timing synchronization function (TSF) field, a multi-link device (MLD)/authentication address field, a reduced neighbor report (RNR) field, a traffic indication map (TIM) field, a change sequence field, a management message integrity check (MIC) element (MME), and/or an optional field. The MAC header may include a MAC address of a transmitter. The MAC address may be randomized. The MLD/authentication address field may include a transmitter's authentication address. The RNR field may include a list of suitable access points in proximity and/or that maintains MLD links with other affiliated access points. The change sequence field may signal whether the PE BSS has a critical parameter update. The MME field may include an integrity check sum of contents of the encrypted beacon frame. The RNR field may include a target beacon transmission time (TBTT) information field. The TBTT information field may include at least a short BSS identifier (ID) field, a BSS parameters field, and/or a multi-link device (MLD) parameters field. The short BSS ID field may be a 4-octets long hash sum of a Service Set Identifier (SSID) associated with the PE BSS. Further, MLD parameters field may include at least a PE access point (AP) field. The PE AP field may be one bit in length. Note that a value of one may indicate that a reported access point is privacy enhanced and a value of zero may indicate that the reported access point is not privacy enhanced.

At 2014, the access point may perform, with the PE wireless station, an encrypted handshake procedure (e.g., such as a multi-way handshake that includes two or more exchanges between participating devices, such as a four-way handshake) to authenticate and associate the PE wireless station with the PE BSS. In some instances, to perform, with the PE wireless station, the encrypted handshake procedure to authenticate and associate the PE wireless station with the PE BSS, the access point may receive, from the PE wireless station, an encrypted authentication request and transmit, to the PE wireless station, an encrypted authentication response. In addition, the access point may receive, from the PE wireless station, an encrypted association request and transmit, to the PE wireless station, an encrypted association response.

In some instances, the access point may host the legacy BSS and the PE BSS. In addition, the access point may host one or more additional PE BSSs. Note that the PE BSS and the one or more additional PE BSSs may each have a unique security domain. Note further that the PE BSS and the one or more additional PE BSSs may each have a unique security key. In some instances, the one or more additional PE BSSs include at least one of a PE guest BSS, a PE Internet of Things (IoT) BSS, a PE backbone mesh BSS, or a PE service BSS. In some instances, the PE IoT BSS may operate as a hidden network. In some instances, the PE backbone mesh BSS may operate as a hidden network. In some instances, the PE service BSS may only be discoverable by wireless stations that have an application or configuration to operate in the PE service BSS. Further, in some instances, the access point may host one or more additional legacy BSSs. The one or more additional legacy BSSs may include at least one of a legacy guest BSS, a legacy Internet of Things (IoT) BSS, a legacy backbone mesh BSS, or a legacy service BSS.

Figure 21A:
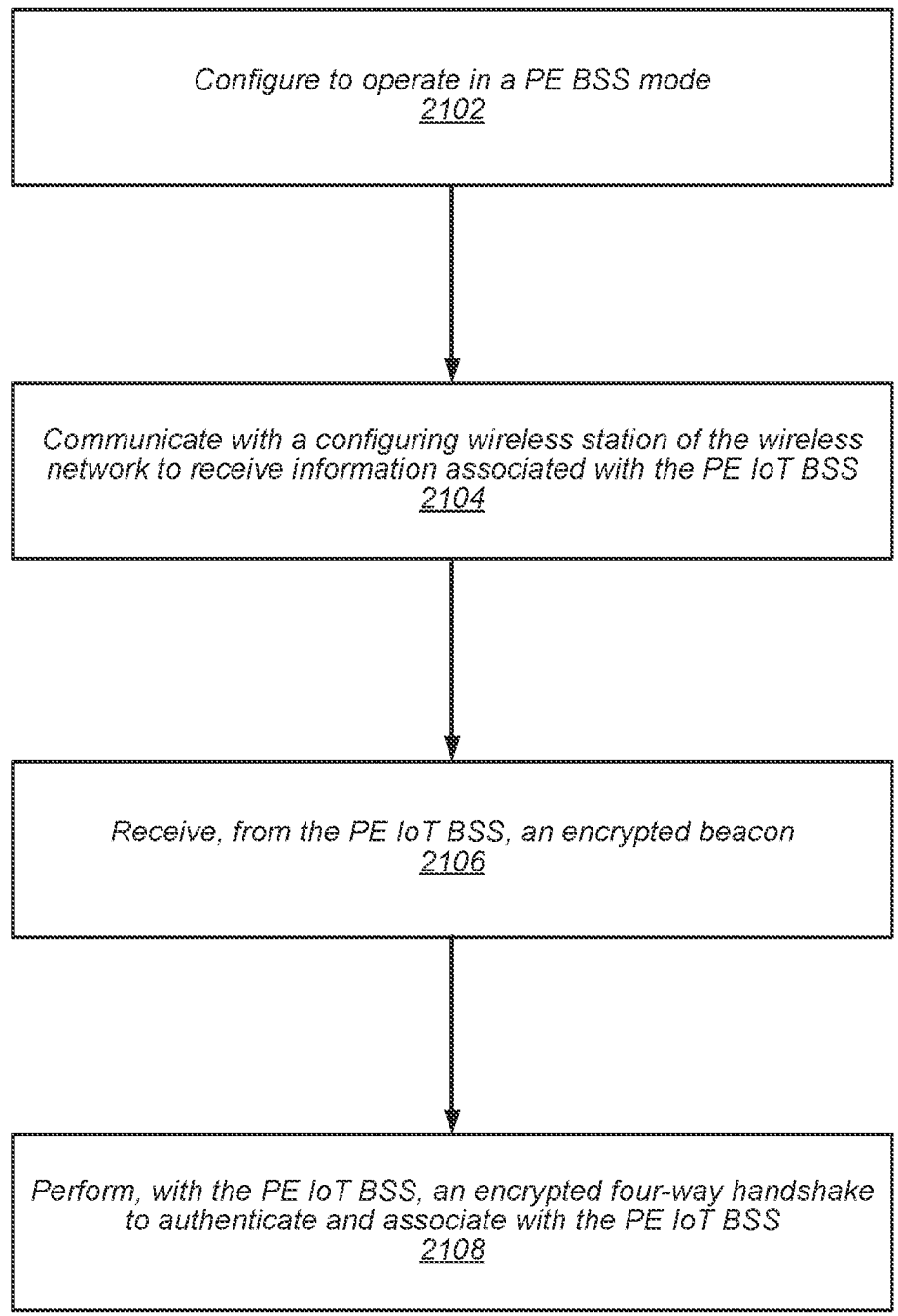
FIGS. 21A and 21B illustrate block diagrams of examples of methods for an IoT station to associate with a PE IoT BSS of a wireless network, according to some embodiments.

FIG. 21A illustrates a block diagram of an example of a method for an IoT station to associate with a PE IoT BSS of a wireless network, according to some embodiments. The method shown in FIG. 21A may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, an IoT station, such as IoT station 107, may configure to operate in a PE BSS mode.

At 2104, the IoT station may communicate with a configuring wireless station, such as wireless station 106, of the wireless network to receive information associated with the PE IoT BSS. The information associated with the PE IoT BSS may include at least a channel on which the PE IoT BSS operates. In some instances, to communicate with the configuring wireless station of the wireless network to receive information associated with the PE IoT BSS, the IoT station may transmit, to the configuring wireless station, an encrypted beacon and perform, with the configuring wireless station, an encrypted handshake procedure (e.g., such as a multi-way handshake that includes two or more exchanges between participating devices, such as a four-way handshake) to authenticate and associate with the configuring wireless station. In addition, the IoT station may receive, from the configuring wireless station, an encrypted data frame containing the information associated with the PE IoT BSS. In some instances, to perform, with the configuring wireless station, the encrypted handshake procedure to authenticate and associate with the configuring wireless station, the IoT station may transmit, to the configuring wireless station, an encrypted authentication request and receive, from the configuring wireless station, an encrypted authentication response. In addition, the IoT station may transmit, to the configuring wireless station, an encrypted association request and receive, from the configuring wireless station, an encrypted association response.

At 2106, the IoT station may receive, from the PE IoT BSS, an encrypted beacon. The encrypted beacon may be encrypted by a beacon key specific to the PE IoT BSS. In some instances, to receive, from the PE IoT BSS, the encrypted beacon, the IoT station may determine, based on an over-the-air BSS identifier (ID), that the IoT station knows the PE IoT BSS. The over-the-air BSS ID may be included in the information associated with the PE IoT BSS received from the configuring wireless station. In some instances, to determine, based on an over-the-air BSS ID, that the IoT station knows the PE IoT BSS, the IoT station may calculate a check sum of the encrypted beacon and determine that the check sum is equivalent to an access point address resolution key (ARK). The ARK may be included in the information associated with the PE IoT BSS received from the configuring wireless station.

In some instances, the encrypted beacon may include one or more of a medium access control (MAC) header field, a timing synchronization function (TSF) field, a multi-link device (MLD)/authentication address field, a reduced neighbor report (RNR) field, a traffic indication map (TIM) field, a change sequence field, a management message integrity check (MIC) element (MME), and/or an optional field. The MAC header may include a MAC address of a transmitter. The MAC address may be randomized. The MLD/authentication address field may include a transmitter's authentication address. The RNR field may include a list of suitable access points in proximity or maintains MLD links with other affiliated access points. The change sequence field may signal whether the PE BSS has a critical parameter update. The MME field include may include an integrity check sum of contents of the encrypted beacon frame. The RNR field may include a target beacon transmission time (TBTT) information field. The TBTT information field may include at least a short BSS identifier (ID) field, a BSS parameters field, and/or a multi-link device (MLD) parameters field. The short BSS ID field may a 4-octets long hash sum of a Service Set Identifier (SSID) associated with the PE BSS. The MLD parameters field may include at least a PE access point (AP) field. The PE AP field may be one bit in length. A value of one may indicate that a reported access point is privacy enhanced and a value of zero indicates that the reported access point is not privacy enhanced.

At 2108, the IoT station may perform, with the PE IoT BSS, an encrypted handshake procedure (e.g., such as a multi-way handshake that includes two or more exchanges between participating devices, such as a four-way handshake) to authenticate and associate with the PE IoT BSS. In some instances, to perform, with the PE IoT BSS, the encrypted handshake procedure to authenticate and associate with the PE IoT BSS, the IoT station may transmit, to the PE IoT BSS, an encrypted authentication request and receive, from the PE IoT BSS, an encrypted authentication response. In addition, the IoT station may transmit, to the PE IoT BSS, an encrypted association request and receive, from the PE IoT BSS, an encrypted association response.

In some instances, the PE IoT BSS may operate as a hidden network. In some instances, an access point, such as access point 112, of the wireless network may host the PE IoT BSS and one or more additional PE BSSs. In such instances, the PE IoT BSS and the one or more additional PE BSSs may each have a unique security domain. Further, the PE IoT BSS and the one or more additional PE BSSs may each have a unique security key. In some instances, the one or more additional PE BSSs may include at least one of a PE resident BSS, a PE guest BSS, a PE backbone mesh BSS, and/or a PE service BSS. The PE backbone mesh BSS may operate as a hidden network. In some instances, the PE service BSS may only be discoverable by wireless stations that have an application or configuration to operate in the PE service BSS. In some instances, the access point may host one or more legacy BSSs. The one or more legacy BSSs may include at least one of a legacy resident BSS, a legacy guest BSS, a legacy Internet of Things (IoT) BSS, a legacy backbone mesh BSS, and/or a legacy service BSS.

Figure 21B:
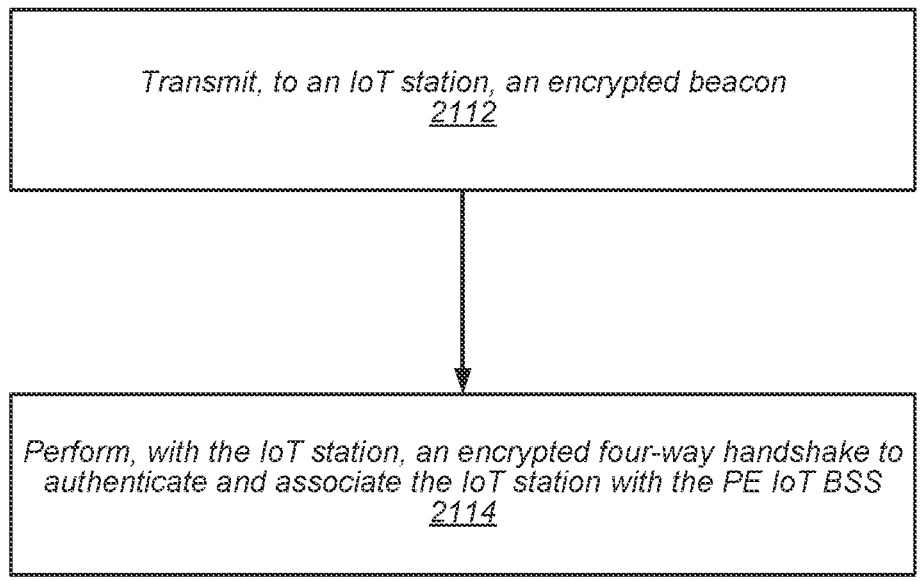

FIG. 21B illustrates a block diagram of an example of a method for an IoT station to associate with a PE IoT BSS of a wireless network, according to some embodiments. The method shown in FIG. 21B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2112, an access point, such as access point 112, may transmit, to an IoT station, such as IoT station 107, an encrypted beacon. The encrypted beacon may be decoded based on information received from a configuring wireless station, such as wireless station 106, associated with the IoT station. The encrypted beacon may be encrypted by a beacon key specific to the PE IoT BSS. Additionally, the information associated with the PE IoT BSS may include at least a channel on which the PE IoT BSS operates. In some instances, the encrypted beacon may include one or more of a medium access control (MAC) header field, a timing synchronization function (TSF) field, a multi-link device (MLD)/authentication address field, a reduced neighbor report (RNR) field, a traffic indication map (TIM) field, a change sequence field, a management message integrity check (MIC) element (MME), and/or an optional field. The MAC header may include a MAC address of a transmitter. The MAC address may be randomized. The MLD/authentication address field may include a transmitter's authentication address. The RNR field may include a list of suitable access points in proximity or maintains MLD links with other affiliated access points. The change sequence field may signal whether the PE BSS has a critical parameter update. The MME field include may include an integrity check sum of contents of the encrypted beacon frame. The RNR field may include a target beacon transmission time (TBTT) information field. The TBTT information field may include at least a short BSS identifier (ID) field, a BSS parameters field, and/or a multi-link device (MLD) parameters field. The short BSS ID field may a 4-octets long hash sum of a Service Set Identifier (SSID) associated with the PE BSS. The MLD parameters field may include at least a PE access point (AP) field. The PE AP field may be one bit in length. A value of one may indicate that a reported access point is privacy enhanced and a value of zero indicates that the reported access point is not privacy enhanced.

At 2114, the access point may perform, with the IoT station, an encrypted handshake procedure (e.g., such as a multi-way handshake that includes two or more exchanges between participating devices, such as a four-way handshake) to authenticate and associate the IoT station with the PE IoT BSS. In some instances, to perform, with the IoT station, the encrypted handshake procedure to authenticate and associate the IoT station with the PE IoT BSS, the access point may receive, from the IoT station, an encrypted authentication request and transmit, to the IoT station, an encrypted authentication response. In addition, the access point may receive, from the IoT station, an encrypted association request and transmit, to the IoT station, an encrypted association response.

In some instances, the PE IoT BSS may operate as a hidden network. In some instances, the access point may host one or more additional PE BSSs. In such instances, the PE IoT BSS and the one or more additional PE BSSs may each have a unique security domain. Additionally, the PE IoT BSS and the one or more additional PE BSSs may each have a unique security key. In some instances, the one or more additional PE BSSs may include at least one of a PE resident BSS, a PE guest BSS, a PE backbone mesh BSS, or a PE service BSS. In some instances, the PE backbone mesh BSS may operate as a hidden network. The PE service BSS may only be discoverable by wireless stations that have an application or configuration to operate in the PE service BSS. In some instances, the access point may host one or more legacy BSSs. The one or more legacy BSSs may include at least one of a legacy resident BSS, a legacy guest BSS, a legacy Internet of Things (IoT) BSS, a legacy backbone mesh BSS, and/or a legacy service BSS.

Figure 22A:
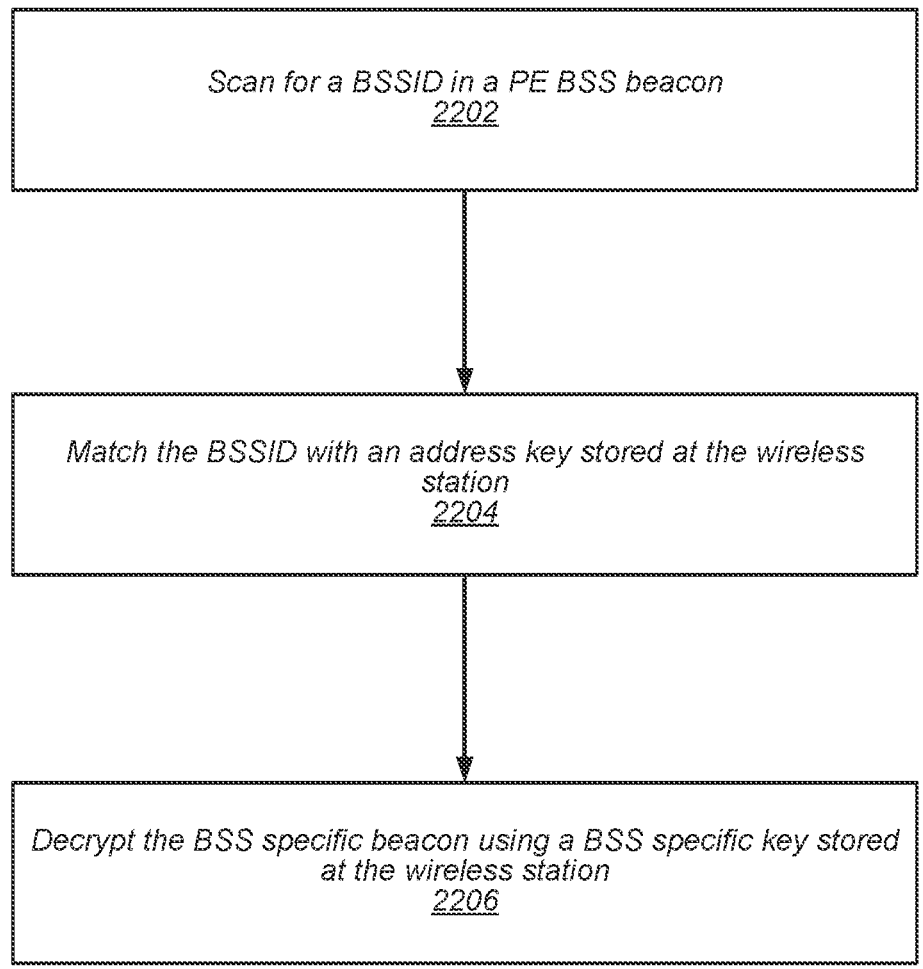
FIG. 22A illustrates a block diagram of an example of a method for a wireless station to receive a PE BSS beacon, according to some embodiments.

FIG. 22A illustrates a block diagram of an example of a method for a wireless station to receive a PE BSS beacon, according to some embodiments. The method shown in FIG. 22A may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, to receive a PE BSS beacon, a wireless station, such as wireless station 106, may scan (or look) for a BSSID in the PE BSS beacon.

At 2204, the wireless station may attempt to match the BSSID with an address key stored at the wireless station.

At 2206, if the BSSID matches the address key, the wireless station may decrypt the BSS specific beacon using a BSS specific key stored at the wireless station.

As noted above, a PE access point that transmits discovery beacons may be discoverable only for PE wireless stations. In some instances, PE wireless stations may use PE query request and response signaling to query PE BSSs that transmit discovery beacons. Additionally, PE BSSs that transmit discovery beacons may respond with an un-encrypted PE query response to probe requests to allow only PE wireless stations to receive the responses. In some instances, a PE BSS that transmits only encrypted beacons may not desire to be discoverable. Thus, such a PE BSS may not respond to any active scanning. In some instances, the PE BSS may setup a secure pre-association connection. For example, the PE BSS may setup pre-association security negotiation (PASN) protection and respond to PASN protected active scanning or queries. As another example, the PE BSS may use a public key to protect identifiers, e.g., such as an Identifier Protection Key (IPK) to respond to protected active scanning and queries. As a further example, the PE BSS may perform a faux (or dummy) association to establish security (e.g., encryption) to respond to protected active scanning and queries prior to performing an actual association that is protected (e.g., encrypted).

Figure 22B:
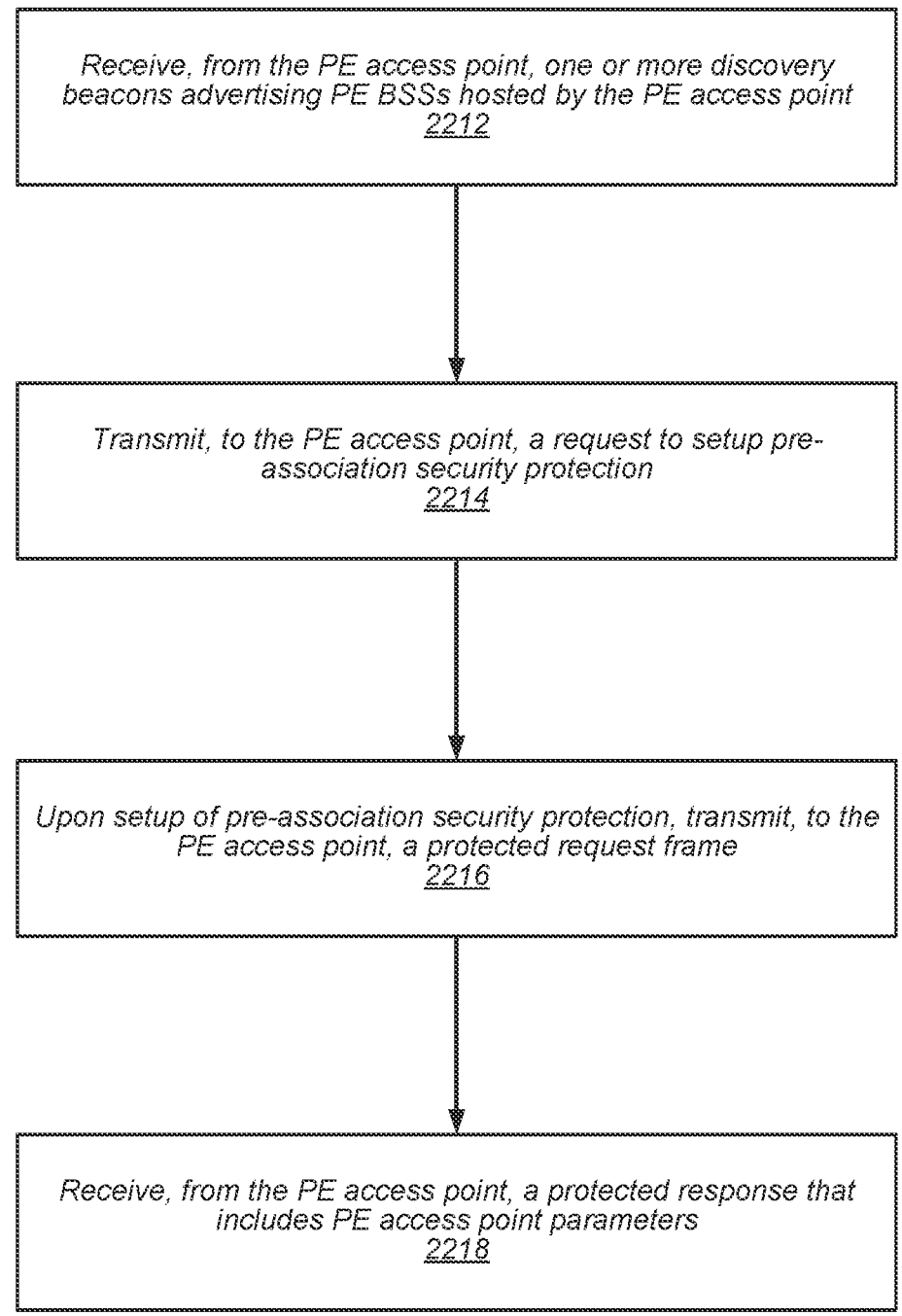
FIGS. 22B and 22C illustrate block diagrams of examples of methods for a PE access point to advertise hosted PE BSSs to non-associated PE wireless stations, according to some embodiments.

FIG. 22B illustrates a block diagram of an example of a method for a privacy enhanced (PE) access point to advertise hosted PE basic service sets (BSSs) to non-associated PE wireless stations, according to some embodiments. The method shown in FIG. 22B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2212, a wireless station, such as wireless station 106, which may be a non-associated PE wireless station, may receive, from a PE access point, such as access point 112, one or more discovery beacons advertising PE BSSs hosted by the PE access point. Each beacon of the one or more discovery beacons may include a medium access control (MAC) header field, a power envelope field, a reduced neighbor report (RNR) field, and/or a management message integrity check (MIC) element (MME) field. The RNR field may include a target beacon transmission time (TBTT) information field. The TBTT information field may include at least a short BSS identifier (ID) field, a BSS parameters field, and/or a multi-link device (MLD) parameters field. The short BSS ID field may be a 4-octets long hash sum of a Service Set Identifier (SSID) associated with a PE BSS. The MLD parameters field may include at least a PE access point (AP) field. The PE AP field may be one bit in length. Note that a value of one may indicate that a reported access point is privacy enhanced and a value of zero may indicate that the reported access point is not privacy enhanced.

At 2214, the wireless station may transmit, to the PE access point, a request to setup pre-association security protection.

At 2216, the wireless station may, upon setup of pre-association security protection, transmit, to the PE access point, a protected request frame. In some instances, to setup pre-association security protection, the wireless station may transmit, to the PE access point, a pre-association security negotiation (PASN) setup request message and receive, from the PE access point, a PASN setup response message. In addition, the wireless station may transmit, to the PE access point, a PASN setup confirm message.

At 2218, the wireless station may receive, from the PE access point, a protected response that includes PE access point parameters. The PE access point parameters may include PE BSS information.

Figure 22C:
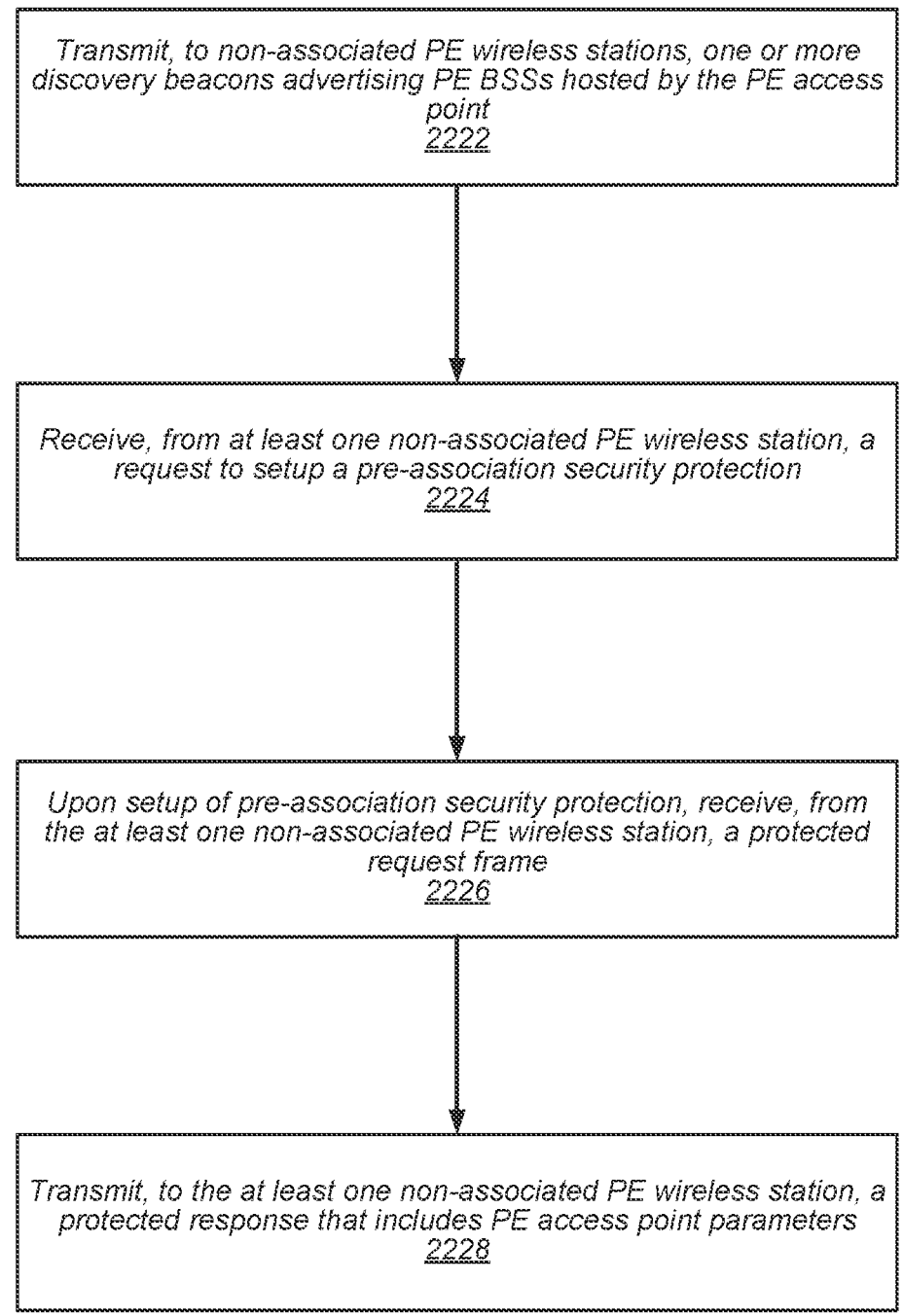

FIG. 22C illustrates a block diagram of an example of a method for a privacy enhanced (PE) access point to advertise hosted PE basic service sets (BSSs) to non-associated PE wireless stations, according to some embodiments. The method shown in FIG. 22C may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2222, an access point, such as access point 112, which may be a PE access point, may transmit, to non-associated PE wireless stations, one or more discovery beacons advertising PE BSSs hosted by the PE access point. Each beacon of the one or more discovery beacons may include a medium access control (MAC) header field, a power envelope field, a reduced neighbor report (RNR) field, and/or a management message integrity check (MIC) element (MME) field. The RNR field may include a target beacon transmission time (TBTT) information field. The TBTT information field may include at least a short BSS identifier (ID) field, a BSS parameters field, and/or a multi-link device (MLD) parameters field. The short BSS ID field may be a 4-octets long hash sum of a Service Set Identifier (SSID) associated with a PE BSS. The MLD parameters field may include at least a PE access point (AP) field. The PE AP field may be one bit in length. Note that a value of one may indicate that a reported access point is privacy enhanced and a value of zero may indicate that the reported access point is not privacy enhanced.

At 2224, the access point may receive, from at least one non-associated PE wireless station, a request to setup a pre-association security protection.

At 2226, the access point may, upon setup of pre-association security protection, receive, from the at least one non-associated PE wireless station, a protected request frame. In some instances, to setup pre-association security protection, the access point may receive, from the at least one non-associated PE wireless station, a pre-association security negotiation (PASN) setup request message and transmit, to the at least one non-associated PE wireless station, a PASN setup response message. In addition, the access point may receive, from the at least one non-associated PE wireless station, a PASN setup confirm message.

At 2228, the access point may transmit, to the at least one non-associated PE wireless station, a protected response that includes PE access point parameters. The PE access point parameters may include PE BSS information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio communicatively coupled to the at least one antenna; and
at least one processor in communication with the at least one radio and configured to cause the wireless station to:
communicate with a legacy basic service set (BSS) of a wireless network to transition to a privacy enhanced (PE) BSS of the wireless network;
receive, from the PE BSS of the wireless network, an encrypted beacon, wherein the encrypted beacon is decoded based on information received from the legacy BSS;
determine, based on an over-the-air BSS identifier (ID), that the wireless station knows the PE BSS, wherein the over-the-air BSS ID is included in the information received from the legacy BSS, and wherein the determination includes calculating a check sum of the encrypted beacon and determining that the check sum is equivalent to an access point address resolution key (ARK) received from the legacy BSS; and
perform, with the PE BSS of the wireless network, an encrypted handshake procedure to authenticate and associate with the PE BSS of the wireless network.

2. The wireless station of claim 1,
wherein the information received from the legacy BSS comprises a PE BSS candidate list, and wherein the PE BSS candidate list comprises a neighbor report and a beacon reception parameter.

3. The wireless station of claim 1,
wherein to communicate with the legacy BSS of the wireless network to transition to the PE BSS of the wireless network, the at least one processor is further configured to cause the wireless station to:
receive, from the legacy BSS of the wireless network, a beacon indicating that the wireless network supports one or more PE BSSs;
transmit, to the legacy BSS, a robust BSS transition query that requests a PE BSS recommendation;
receive, from the legacy BSS, a robust BSS transition request comprising a PE BSS candidate list that includes the PE BSS; and
send, to the legacy BSS, a robust BSS transition response indicating a transition to the PE BSS.

4. The wireless station of claim 1,
wherein to perform, with the PE BSS of the wireless network, the encrypted handshake procedure to authenticate and associate with the PE BSS, the at least one processor is further configured to cause the wireless station to:
transmit, to the PE BSS, an encrypted authentication request;
receive, from the PE BSS, an encrypted authentication response;
transmit, to the PE BSS, an encrypted association request; and
receive, from the PE BSS, an encrypted association response.

5. The wireless station of claim 1,
wherein an access point of the wireless network hosts the legacy BSS and the PE BSS.

6. The wireless station of claim 5,
wherein the access point hosts one or more additional PE BSSs, and wherein the PE BSS and the one or more additional PE BSSs each have a unique security key, wherein the one or more additional PE BSSs include at least one of a PE guest BSS, a PE Internet of Things (IoT) BSS that operates as a hidden network, a PE backbone mesh BSS that operates as a hidden network, or a PE service BSS that is discoverable only by a wireless station that has an application or configuration to operate in the PE service BSS.

7. The wireless station of claim 5,
wherein the access point hosts one or more additional legacy BSSs, including at least one of a legacy guest BSS, a legacy Internet of Things (IoT) BSS, a legacy backbone mesh BSS, or a legacy service BSS.

8. The wireless station of claim 1,
wherein the encrypted beacon is encrypted by a beacon key specific to the PE BSS.

9. The wireless station of claim 1,
wherein the encrypted beacon includes one or more of a medium access control (MAC) header field, a timing synchronization function (TSF) field, a multi-link device (MLD)/authentication address field, a reduced neighbor report (RNR) field, a traffic indication map (TIM) field, a change sequence field, a management message integrity check (MIC) element (MME), or an optional field.

10. An apparatus, comprising:
a memory; and
at least one processor in communication with the memory and configured to:
communicate with a legacy basic service set (BSS) of a wireless network to transition to a privacy enhanced (PE) BSS of the wireless network;
receive, from the PE BSS of the wireless network, an encrypted beacon, wherein the encrypted beacon is decoded based on information received from the legacy BSS;
determine, based on an over-the-air BSS identifier (ID), that the PE BSS is known, wherein the over-the-air BSS ID is included in the information received from the legacy BSS, and wherein the determination includes calculating a check sum of the encrypted beacon and determining that the check sum is equivalent to an access point address resolution key (ARK) received from the legacy BSS; and
perform, with the PE BSS of the wireless network, an encrypted handshake procedure to authenticate and associate with the PE BSS of the wireless network.

11. The apparatus of claim 10,
wherein the encrypted beacon includes a medium access control (MAC) header field comprising a MAC address of a transmitter, and wherein the MAC address is randomized.

12. The apparatus of claim 10,
wherein the encrypted beacon includes a multi-link device (MLD)/authentication address field comprising an authentication address associated with a transmitter.

13. The apparatus of claim 10,
wherein the encrypted beacon includes a reduced neighbor report (RNR) field comprising a list of proximate access points or maintains multi-link device (MLD) links with other affiliated access points and a target beacon transmission time (TBTT) information field comprising at least a short BSS identifier (ID) field, a BSS parameters field, and an MLD parameters field.

14. The apparatus of claim 10,
wherein the encrypted beacon comprises a change sequence field that signals whether the PE BSS has a critical parameter update.

15. The apparatus of claim 10,
wherein the encrypted beacon includes a management message integrity check (MIC) element (MME) field comprising an integrity check sum of contents of the encrypted beacon frame.

16. A non-transitory computer readable memory medium storing instructions executable by processing circuitry of a wireless station to:
communicate with a legacy basic service set (BSS) of a wireless network to transition to a privacy enhanced (PE) BSS of the wireless network;
receive, from the PE BSS of the wireless network, an encrypted beacon, wherein the encrypted beacon is decoded based on information received from the legacy BSS;
determine, based on an over-the-air BSS identifier (ID), that the wireless station knows the PE BSS, wherein the over-the-air BSS ID is included in the information received from the legacy BSS, and wherein the determination includes calculating a check sum of the encrypted beacon and determining that the check sum is equivalent to an access point address resolution key (ARK) received from the legacy BSS; and
perform, with the PE BSS of the wireless network, an encrypted handshake procedure to authenticate and associate with the PE BSS of the wireless network.

17. The non-transitory computer readable memory medium of claim 16,
wherein to receive, from a PE BSS of the wireless network, the encrypted beacon, the instructions are further executable by the processing circuitry of the wireless station to determine, based on an over-the-air BSS identifier (ID), that the wireless station knows the PE BSS, wherein the over-the-air BSS ID is included in the information received from the legacy BSS.

18. The non-transitory computer readable memory medium of claim 16,
wherein the information received from the legacy BSS includes a PE BSS candidate list comprising a neighbor report and a beacon reception parameter.

19. The non-transitory computer readable memory medium of claim 16,
wherein an access point of the wireless network hosts the legacy BSS, the PE BSS, and one or more additional PE BSSs, and wherein the PE BSS and the one or more additional PE BSSs each have a unique security domain.

20. The non-transitory computer readable memory medium of claim 16,
wherein an access point of the wireless network hosts the legacy BSS, the PE BSS, and one or more additional legacy BSSs, including at least one of a legacy guest BSS, a legacy Internet of Things (IoT) BSS, a legacy backbone mesh BSS, or a legacy service BSS.

* * * * *